US012701483B2

(12) United States Patent
Sen et al.

(10) Patent No.: US 12,701,483 B2
(45) Date of Patent: Aug. 4, 2026

(54) MANAGING CONNECTIVITY OF A WIRELESS DEVICE IN A CELLULAR COMMUNICATION NETWORK

(71) Applicant: Telefonaktiebolaget LM Ericsson (publ), Stockholm (SE)

(72) Inventors: Ayan Sen, Bangalore (IN); Surajit Mondal, Bangalore (IN); Shikha Singh, Gurgaon (IN); Juin Chattopadhyay, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 295 days.

(21) Appl. No.: 18/565,587

(22) PCT Filed: Jun. 16, 2021

(86) PCT No.: PCT/IN2021/050588
§ 371 (c)(1),
(2) Date: Nov. 30, 2023

(87) PCT Pub. No.: WO2022/264150
PCT Pub. Date: Dec. 22, 2022

(65) Prior Publication Data
US 2024/0259905 A1      Aug. 1, 2024

(51) Int. Cl.
H04W 36/30 (2009.01)
H04W 36/00 (2009.01)
(Continued)

(52) U.S. Cl.
CPC ..... H04W 36/302 (2023.05); H04W 36/0083 (2013.01); H04W 36/14 (2013.01);
(Continued)

(58) Field of Classification Search
CPC ............. H04W 88/06; H04W 36/1443; H04W 36/0083; H04W 36/322; H04W 36/302; H04W 36/14; H04W 36/32
See application file for complete search history.

(56) References Cited

U.S. PATENT DOCUMENTS

2018/0098258 A1* 4/2018 Annam ................... H04W 4/02
2021/0385865 A1* 12/2021 Mueck .............. H04W 74/0875
2022/0388505 A1* 12/2022 Sharma Banjade .........................
G08G 1/096783

FOREIGN PATENT DOCUMENTS

WO      2021006659 A1      1/2021

OTHER PUBLICATIONS

International Search Report and Written Opinion of the International Searching Authority, PCT/IN2021/050588, mailed Oct. 1, 2021, 11 pages.

* cited by examiner

Primary Examiner — Muhammad N Edun
(74) Attorney, Agent, or Firm — Sage Patent Group

(57)      ABSTRACT

The present application relates to a computer implemented method for managing connectivity of a wireless device in a cellular communication network, wherein the wireless device is operable to connect to a cell of a first radio-access technology, RAT, and to a cell of a second RAT. The method includes receiving location information for the wireless device, wherein the wireless device is connected to a first RAT cell hosted by the serving radio access node, and is also connected to a second RAT cell, and wherein a signal strength of the second RAT cell, received at the wireless device, has fallen below a trigger threshold. The method further includes identifying neighbour first and second RAT cells, and assembling, a candidate set of cell combinations.

19 Claims, 28 Drawing Sheets

(51) Int. Cl.
*H04W 36/14* (2009.01)
*H04W 36/32* (2009.01)

(52) U.S. Cl.
CPC ........ *H04W 36/32* (2013.01); *H04W 36/1443* (2023.05); *H04W 36/322* (2023.05)

500

| Supported Band Combination | LTE Frequency band | NF Frequency band |
|:---:|:---:|:---:|
| 1 | LTE1 | NR1 |
| 2 | LTE2 | NR2 |

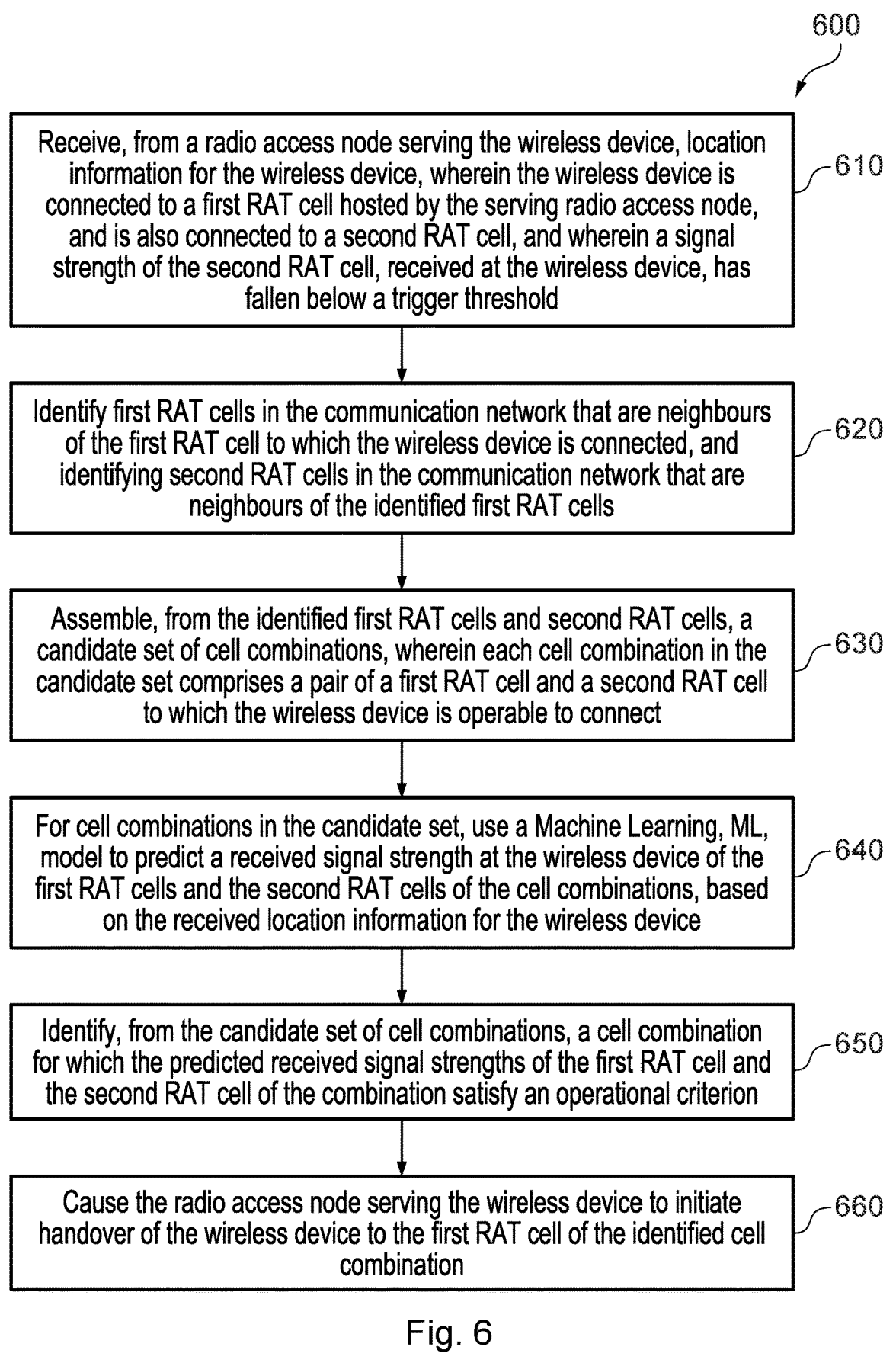

600

Receive, from a radio access node serving the wireless device, location information for the wireless device, wherein the wireless device is connected to a first RAT cell hosted by the serving radio access node, and is also connected to a second RAT cell, and wherein a signal strength of the second RAT cell, received at the wireless device, has fallen below a trigger threshold    610

Identify first RAT cells in the communication network that are neighbours of the first RAT cell to which the wireless device is connected, and identifying second RAT cells in the communication network that are neighbours of the identified first RAT cells    620

Assemble, from the identified first RAT cells and second RAT cells, a candidate set of cell combinations, wherein each cell combination in the candidate set comprises a pair of a first RAT cell and a second RAT cell to which the wireless device is operable to connect    630

For cell combinations in the candidate set, use a Machine Learning, ML, model to predict a received signal strength at the wireless device of the first RAT cells and the second RAT cells of the cell combinations, based on the received location information for the wireless device    640

Identify, from the candidate set of cell combinations, a cell combination for which the predicted received signal strengths of the first RAT cell and the second RAT cell of the combination satisfy an operational criterion    650

Cause the radio access node serving the wireless device to initiate handover of the wireless device to the first RAT cell of the identified cell combination    660

Fig. 6

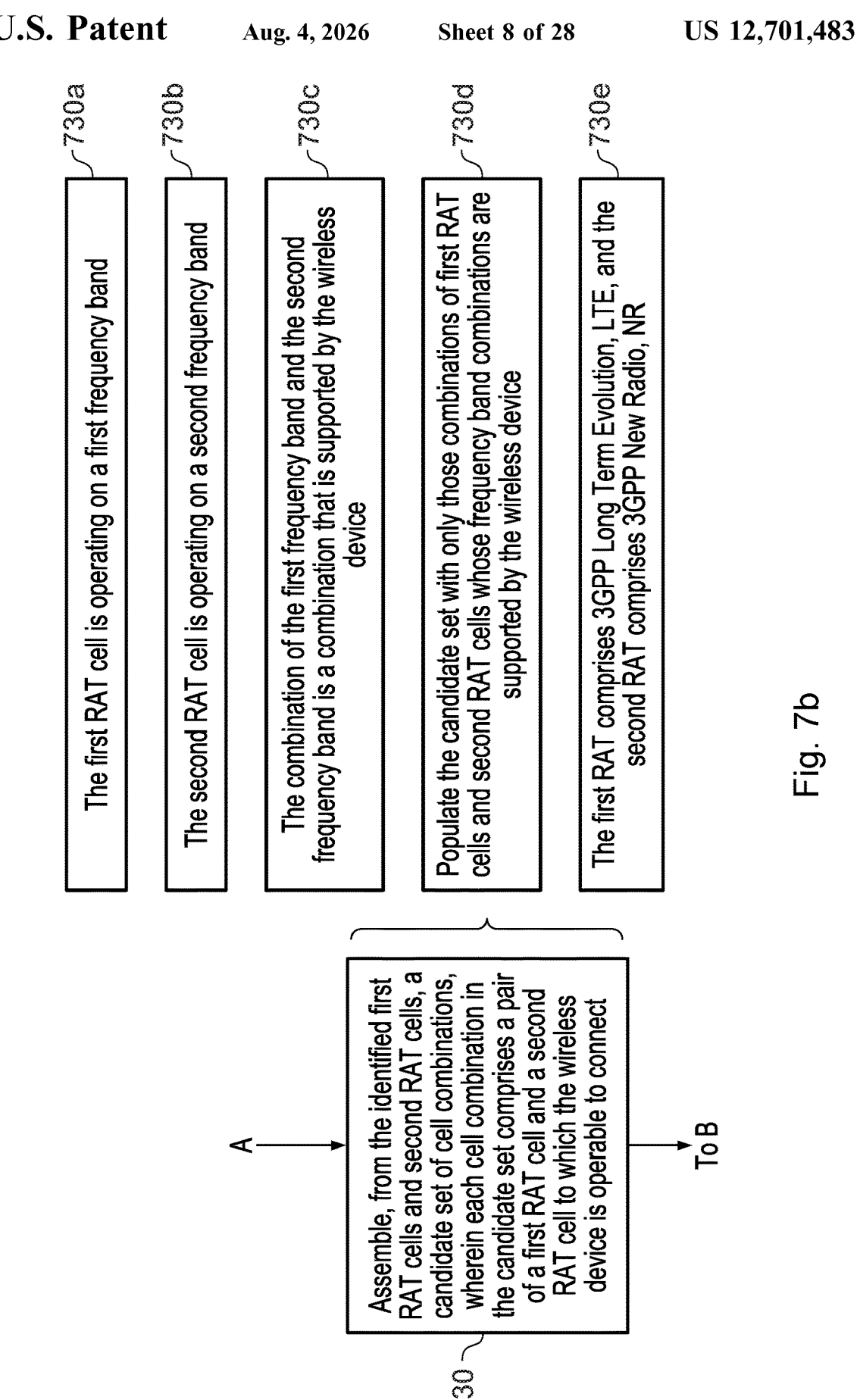

730a — The first RAT cell is operating on a first frequency band

730b — The second RAT cell is operating on a second frequency band

730c — The combination of the first frequency band and the second frequency band is a combination that is supported by the wireless device 730d — Populate the candidate set with only those combinations of first RAT cells and second RAT cells whose frequency band combinations are supported by the wireless device 730e — The first RAT comprises 3GPP Long Term Evolution, LTE, and the second RAT comprises 3GPP New Radio, NR 730 — Assemble, from the identified first RAT cells and second RAT cells, a candidate set of cell combinations, wherein each cell combination in the candidate set comprises a pair of a first RAT cell and a second RAT cell to which the wireless device is operable to connect

Figure 7C:
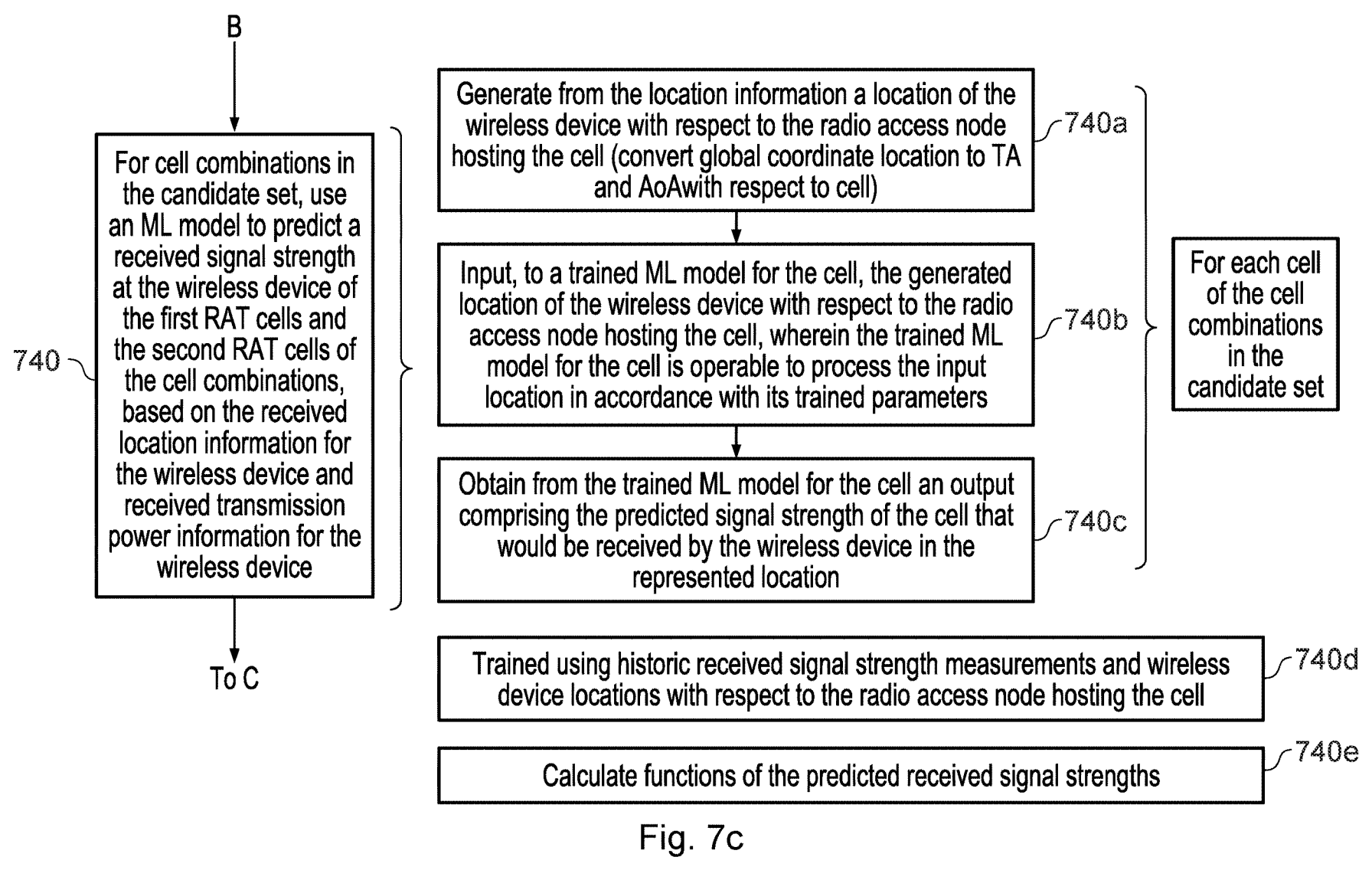

For each cell of the cell combinations in the candidate set

740a

Generate from the location information a location of the wireless device with respect to the radio access node hosting the cell (convert global coordinate location to TA and AoA with respect to cell)

740b

Input, to a trained ML model for the cell, the generated location of the wireless device with respect to the radio access node hosting the cell, wherein the trained ML model for the cell is operable to process the input location in accordance with its trained parameters 740c Obtain from the trained ML model for the cell an output comprising the predicted signal strength of the cell that would be received by the wireless device in the represented location 740d Trained using historic received signal strength measurements and wireless device locations with respect to the radio access node hosting the cell 740e Calculate functions of the predicted received signal strengths

For cell combinations in the candidate set, use an ML model to predict a received signal strength at the wireless device of the first RAT cells and the second RAT cells of the cell combinations, based on the received location information for the wireless device and received transmission power information for the wireless device To C

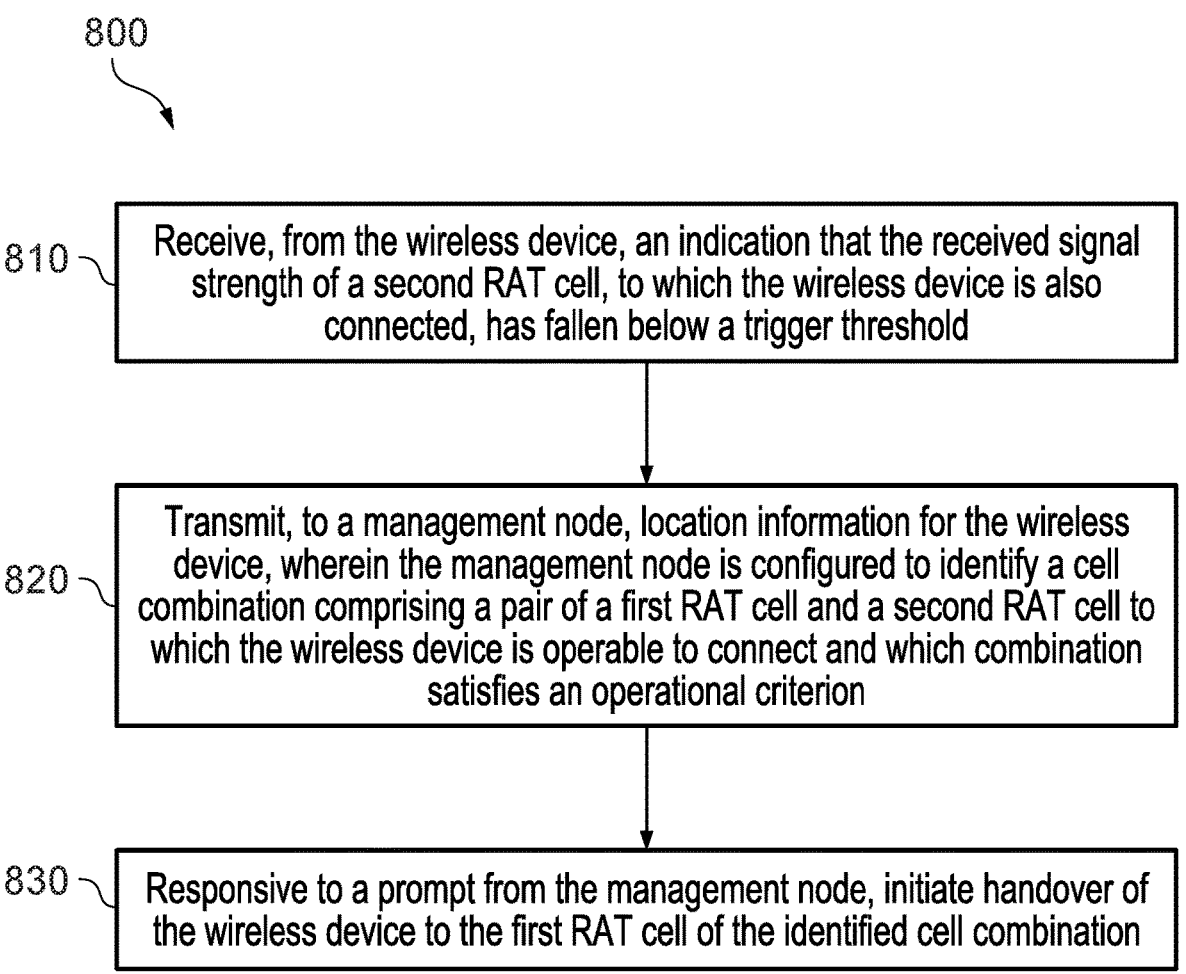

800

810 — Receive, from the wireless device, an indication that the received signal strength of a second RAT cell, to which the wireless device is also connected, has fallen below a trigger threshold 820 — Transmit, to a management node, location information for the wireless device, wherein the management node is configured to identify a cell combination comprising a pair of a first RAT cell and a second RAT cell to which the wireless device is operable to connect and which combination satisfies an operational criterion 830 — Responsive to a prompt from the management node, initiate handover of the wireless device to the first RAT cell of the identified cell combination

Fig. 8

| Site | LTE Cell | NR Cell |
|------|----------|---------|
| A | LTE1A | NR1A |
| A | LTE1A | NR1C |
| A | LTE2A | NR2E |
| A | LTE2A | NR2A |
| B | LTE1B | NR1B |
| C | LTE1C | NR1C |
| C | LTE1C | NR1A |
| C | LTE2C | NR2C |
| D | LTE1D | NR1D |
| D | LTE2D | NR2D |

1600

| Site | LTE Cell | NR Cell | endcHoFreqPriority | endcB1MeasPriority |
|------|----------|---------|--------------------|--------------------|
| A | LTE1A | NR1A | 6 | 7 |
| A | LTE1A | NR1C | 6 | 6 |
| A | LTE2A | NR2E | 7 | 5 |
| A | LTE2A | NR2A | 7 | 7 |
| B | LTE1B | NR1B | 7 | 5 |
| C | LTE1C | NR1C | 6 | 6 |
| C | LTE1C | NR1A | 6 | 7 |
| C | LTE2C | NR2C | 5 | 7 |
| D | LTE1D | NR1D | 6 | 7 |
| D | LTE2D | NR2D | 5 | 6 |

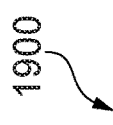

1900

| Neighbor cell | | RSRP | | {x-min(LTE RSRP)}/{max(LTE RSRP) - min(LTE RSRP)} | {m-min(NR RSRP)}/{max(NR RSRP) - min(NR RSRP)} | Frequency Priority | | endcHoFreq Priority*0.1 | endcB1Meas Priority*0.1 | Score$_{LTE}$ & Score$_{NR}$ | |
|---|---|---|---|---|---|---|---|---|---|---|---|
| LTE Cell | NR Cell | LTE RSRP | NR RSRP | Normalized LTE RSRP (x) | Normalized NR RSRP (m) | endcHo Freq Priority | endcB1 Meas Priority | Normalized value (y) | Normalized value (n) | x*y (Score$_{LTE}$) | m*n (Score$_{NR}$) |
| LTE2A | NR2A | -85 | -90 | 0.091 | 0.167 | 7 | 7 | 0.7 | 0.7 | 0.064 | 0.117 |
| LTE1A | NR1A | -75 | -80 | 0.545 | 0.583 | 6 | 7 | 0.6 | 0.7 | 0.327 | 0.408 |
| LTE1B | NR1B | -65 | -78 | 1 | 0.667 | 7 | 5 | 0.7 | 0.5 | 0.7 | 0.333 |
| LTE2C | NR2C | -80 | -70 | 0.318 | 1 | 5 | 7 | 0.5 | 0.7 | 0.159 | 0.7 |
| LTE1C | NR1C | -73 | -82 | 0.636 | 0.5 | 6 | 6 | 0.6 | 0.6 | 0.382 | 0.3 |
| LTE1D | NR1D | -87 | -94 | 0 | 0 | 6 | 7 | 0.6 | 0.7 | 0 | 0 |

Fig. 19

Neighbor List Creation

Normalization and Scaling followed by UEs movement to suitable LTE-NR cell

2100
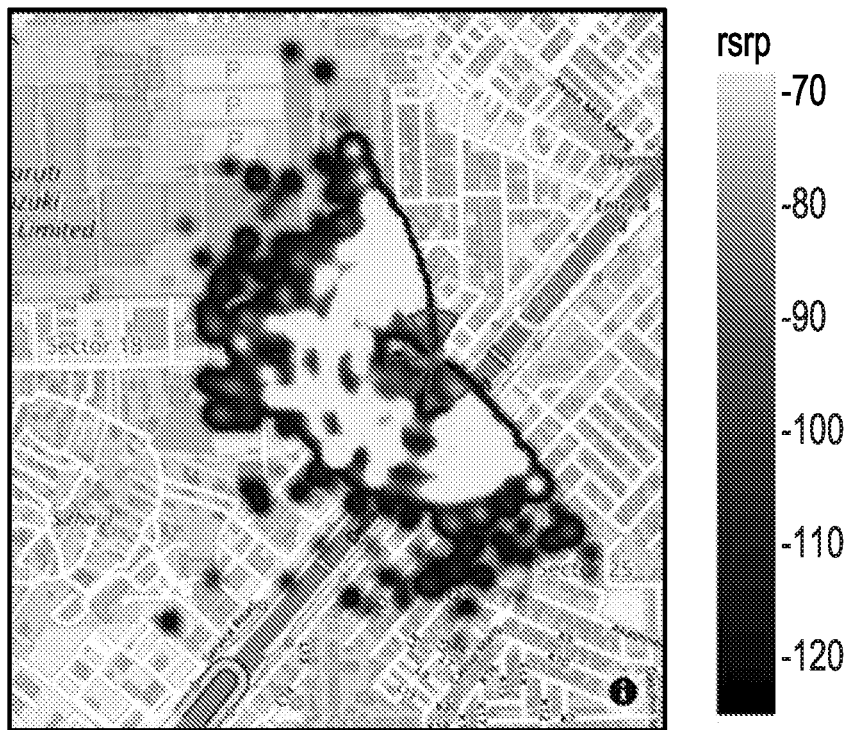
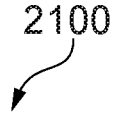
Fig. 21

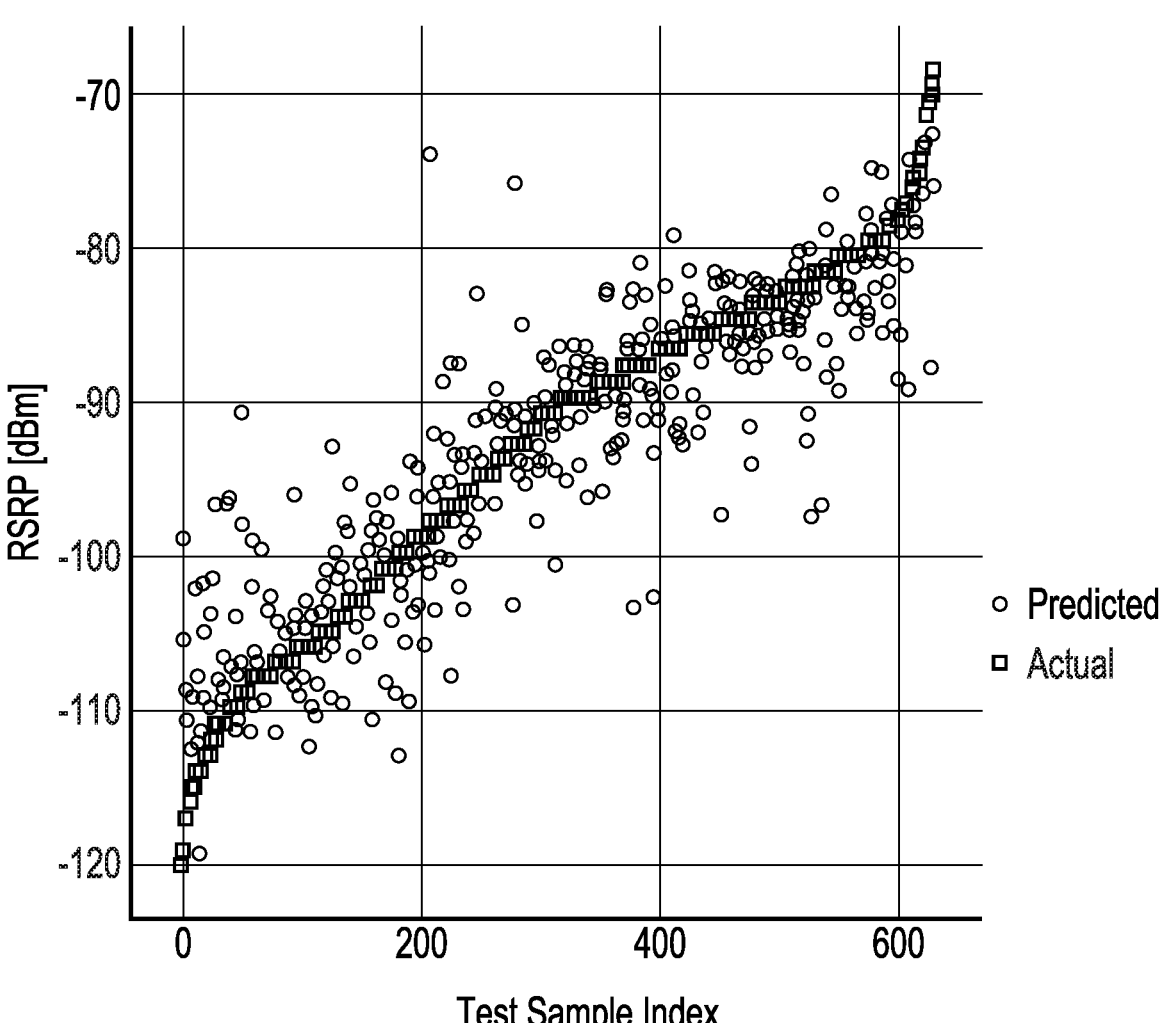
Fig. 22

2300

MANAGING CONNECTIVITY OF A WIRELESS DEVICE IN A CELLULAR COMMUNICATION NETWORK

CROSS REFERENCE TO RELATED APPLICATIONS

This application is a 35 U.S.C. § 371 national stage application of PCT International Application No. PCT/IN2021/050588 filed on Jun. 16, 2021, the disclosure and content of which is incorporated by reference herein in its entirety.

TECHNICAL FIELD

The present disclosure relates to methods for managing connectivity of a wireless device in a cellular communication network. The present disclosure also relates to a management node, a radio access node and to a computer program.

BACKGROUND

The development and deployment of 5G networks has increased over recent years, and consequently the number of users that require a connection to a 5G network has also increased. The "Non-Stand Alone" (NSA) architecture for 5G enables the 5G Radio Access Network (RAN), and its New Radio (NR) interface, to be used in conjunction with the existing 4G Radio, Long Term Evolution (LTE), and 4G Core, the Evolved Packet Core. In this manner, NR technology is made available without network replacement, as 4G services enjoy the capacities offered by the 5G NR, including high throughput, low latency, etc. The NSA is also known as "E-UTRAN—NR Dual Connectivity (EN-DC)", and allows a user equipment to connect to an LTE enodeB that acts as a master node, and a 5G gnodeB that acts as a secondary node.

In order to provide users with reliable NR performance, 5G networks aim to achieve high throughput, low latency, and high Time on NR (ToNR), that is a high proportion of time during which a user is connected to NR. In particular, there is a desire to increase ToNR, as this metric is a direct measure of a wireless device or user equipment (UE) being connected to NR, which improves overall user perception of a 5G network.

FIG. 1 illustrates an example of an EN-DC network scenario 100. The scenario 100 comprises an EN-DC capable UE 110, which is connected to a master LTE cell 130 and to a secondary NR cell 120. Master LTE cell 130 is referred to as an anchor cell; the UE 110 first connects to the master LTE cell 130, and then performs an NR leg set-up operation to connect to the secondary NR cell 120 for connection to the 5G network. As illustrated in scenario 100, the secondary NR cell coverage area is smaller than that of the master LTE cell 130. Movement of the UE 110 may therefore result in a loss of connectivity to NR cell 120 while the UE 110 remains connected to the anchor LTE cell 130.

ToNR is influenced by a number of factors. For example, complex EN-DC deployment scenarios may result in one or multiple NR cells at different frequency layers combined with one or multiple anchor LTE cells at different frequency layers. Such complex deployment scenarios require careful planning and design for optimized network coverage. Providing full contiguous 5G coverage is a costly process and may not always be in line with strategic priorities. Another factor that influences ToNR is network mobility strategy, in which configuration settings including thresholds and activity and inactivity timers for NR leg setup, release and modification may affect ToNR. Additionally, mobility strategy and associated configuration settings play an important role in deciding overall ToNR. UE capability can also influence ToNR, as different combinations of anchor and NR layer may be supported by different UEs. The type of UE and its connectivity features can play an important role in determining ToNR, and should therefore be considered in the different phases of network deployment with a view to improving ToNR.

The various factors that affect ToNR mean that the overall measurement and optimization process for ToNR can become highly convoluted. The current implementation of 5G RAN features opens different avenues to improve ToNR, and hence the user perception of 5G.

SUMMARY

It is an aim of the present disclosure to provide a method, a management node, and a computer program product which at least partially address one or more of the challenges discussed above. It is a further aim of the present disclosure to provide a method, a management node and a computer program product that cooperate to provide improved ToNR in a communication network.

According to a first aspect of the present disclosure there is provided a computer implemented method for managing connectivity of a wireless device in a cellular communication network, wherein the wireless device is operable to connect to a cell of a first radio-access technology (RAT) and to a cell of a second RAT, the method, performed by a management node. The method comprises receiving, from a radio access node serving the wireless device, location information for the wireless device, wherein the wireless device is connected to a first RAT cell hosted by the serving radio access node, and is also connected to a second RAT cell, and wherein a signal strength of the second RAT cell, received at the wireless device, has fallen below a trigger threshold; identifying first RAT cells in the communication network that are neighbours of the first RAT cell to which the wireless device is connected, and identifying second RAT cells in the communication network that are neighbours of the identified first RAT cells; assembling, from the identified first RAT cells and second RAT cells, a candidate set of cell combinations, wherein each cell combination in the candidate set comprises a pair of a first RAT cell and a second RAT cell to which the wireless device is operable to connect; for cell combinations in the candidate set, using a Machine Learning, ML, model to predict a received signal strength at the wireless device of the first RAT cells and the second RAT cells of the cell combinations, based on the received location information for the wireless device; identifying, from the candidate set of cell combinations, a cell combination for which the predicted received signal strengths of the first RAT cell and the second RAT cell of the combination satisfy an operational criterion; and causing the radio access node serving the wireless device to initiate handover of the wireless device to the first RAT cell of the identified cell combination.

According to a second aspect of the present disclosure there is provided a computer implemented method for managing connectivity of a wireless device in a cellular communication network, wherein the wireless device is operable to connect to a cell of a first radio-access technology (RAT) and to a cell of a second RAT, the method, performed by radio access node hosting a first RAT cell to which the wireless device is connected. The method comprises receiving, from the wireless device, an indication that the received signal strength of a second RAT cell, to which the wireless device is also connected, has fallen below a trigger threshold; transmitting, to a management node, location information for the wireless device, wherein the management node is configured to identify a cell combination comprising a pair of a first RAT cell and a second RAT cell to which the wireless device is operable to connect and which combination satisfies an operational criterion; and responsive to a prompt from the management node, initiating handover of the wireless device to the first RAT cell of the identified cell combination.

According to a third aspect of the present disclosure there is provided a computer readable medium, the computer readable medium having computer readable code embodied therein, the computer readable code being configured such that, on execution by a suitable computer or processor, the computer or processor is caused to perform a method according to the first aspect or the second aspect.

According to a fourth aspect of the present disclosure there is provided a management node for managing connectivity of a wireless device in a cellular communication network, wherein the wireless device is operable to connect to a cell of a first radio-access technology, RAT, and to a cell of a second RAT. The management node comprises processing circuitry configured to cause the management node to: receive, from a radio access node serving the wireless device, location information for the wireless device, wherein the wireless device is connected to a first RAT cell hosted by the serving radio access node, and is also connected to a second RAT cell, and wherein a signal strength of the second RAT cell, received at the wireless device, has fallen below a trigger threshold; identify first RAT cells in the communication network that are neighbours of the first RAT cell to which the wireless device is connected, and identify second RAT cells in the communication network that are neighbours of the identified first RAT cells; assemble, from the identified first RAT cells and second RAT cells, a candidate set of cell combinations, wherein each cell combination in the candidate set comprises a pair of a first RAT cell and a second RAT cell to which the wireless device is operable to connect; for cell combinations in the candidate set, use a Machine Learning, ML, model to predict a received signal strength at the wireless device of the first RAT cells and the second RAT cells of the cell combinations, based on the received location information for the wireless device; identify, from the candidate set of cell combinations, a cell combination for which the predicted received signal strengths of the first RAT cell and the second RAT cell of the combination satisfy an operational criterion; and cause the radio access node serving the wireless device to initiate hand over of the wireless device to the first RAT cell of the identified cell combination.

According to a fifth aspect of the present disclosure there is provided a radio access node for managing connectivity of a wireless device in a cellular communication network, wherein the wireless device is operable to connect to a cell of a first radio-access technology, RAT, and to a cell of a second RAT. The radio access node comprises processing circuitry configured to case the radio access node to: receive, from the wireless device, an indication that the received signal strength of a second RAT cell, to which the wireless device is also connected, has fallen below a trigger threshold; transmit, to a management node, location information for the wireless device, wherein the management node is configured to identify a cell combination comprising a pair of a first RAT cell and a second RAT cell to which the wireless device is operable to connect and which combination satisfies an operational criterion; and responsive to a prompt from the management node, initiate handover of the wireless device to the first RAT cell of the identified cell combination.

BRIEF DESCRIPTION OF THE DRAWINGS

For a better understanding of the present disclosure, and to show more clearly how it may be carried into effect, reference will now be made, by way of example, to the following drawings in which:

FIG. 6 is a flow chart illustrating process steps in a computer implemented method for managing connectivity of a wireless device in a cellular communication network;

FIGS. 7a-e show a flow chart illustrating process steps in another computer implemented method for managing connectivity of a wireless device in a cellular communication network;

FIG. 8 is a flow chart illustrating process steps in another computer implemented method for managing connectivity of a wireless device in a cellular communication network;

FIG. 19 is a table illustrating signal strength scores between a UE and cells;

FIG. 21 is a diagram illustrating historic RSRP values of a UE relative to a cell;

FIG. 22 is a graph illustrating ML model output against predicted RSRP;

DETAILED DESCRIPTION

Figure 1:
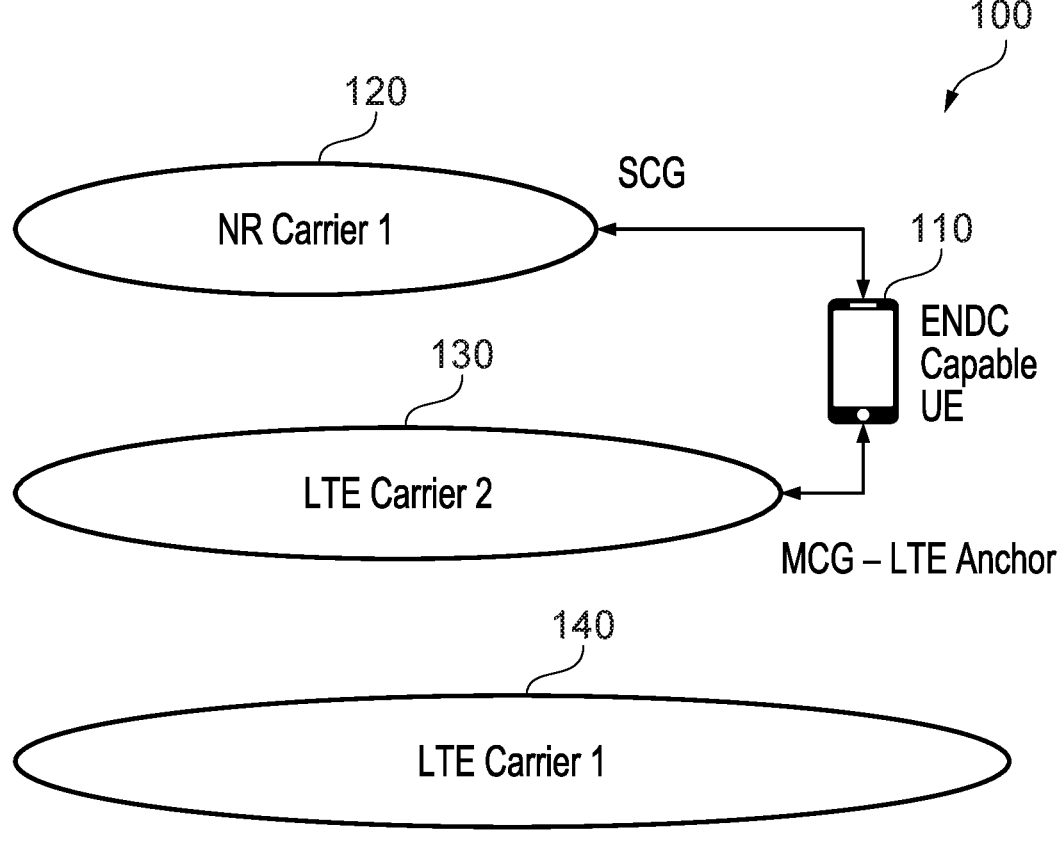
FIG. 1 illustrates an example of a network scenario.

Examples of the present disclosure relate to methods and apparatus for managing connectivity of a wireless device in a cellular communication network. The communication network may encompass multiple Radio Access Technologies (RATs), including for example Third Generation Partnership Project (3GPP) $4^{th}$ and $5^{Th}$ generation networks. Examples of the present disclosure are operable to improve the time spent connected to a second RAT, when also connected to a first RAT. In the context of EN-DC, and 4G and 5G networks, examples of the present disclosure are operable to improve Time on NR, hereafter referred to as ToNR. For the purposes of the present disclosure the terms UE and wireless device may be used interchangeably and may refer to any device capable of connecting to a communication network cell.

In the context of EN-DC, examples of the present disclosure provide methods for enabling identification of an optimal LTE anchor cell and NR secondary cell combination to which a wireless device may connect, in the event that the wireless device loses connection to an NR cell. Examples of the present disclosure use a trained Machine Learning (ML) model, which can predict the signal strength for viable combinations of LTE and NR cells to which the UE is operable to connect. The prediction is based on the location of the UE, and may also take account of UE transmission power. Example methods according to the present disclosure may then use the predicted signal strengths to identify an optimal LTE and NR cell combination. In some examples, an optimal combination may be defined as, for all cell combinations supported by the UE in which the LTE anchor cell can be received by the UE with an acceptable signal strength, the combination in which the NR cell can be received by the UE with the highest signal strength. By considering both LTE and NR signal strength, examples of the present disclosure may reduce the possibility of NR Radio Link Failure (RLF), as well as prompting handover to a suitable LTE cell as soon as NR coverage falls below a certain threshold, thus increasing ToNR. In addition, examples of the present disclosure have minimal requirements for real time signal strength measurement and reporting, owing to the use of a trained ML model.

In order to provide additional context to the description of methods according to the present disclosure, there now follows a more detailed explanation of EN-DC procedures.

In the currently established standards for EN-DC enabled networks, an NR leg setup procedure occurs as a result of the following network events.

1) When an EN-DC capable UE is latched on to an LTE anchor, the NR leg setup procedure is initiated after successful initial context setup, based on a B1 measurement report from the UE, where the B1 measurement report is defined in 3GPP standards.

2) Once an EN-DC capable UE performs initial context setup to connect on to an LTE cell that does not offer NR coverage, or that has lower priority NR frequency coverage, an inter-frequency LTE handover to another LTE anchor cell may be initiated, followed by NR leg setup from the new anchor cell.

3) At the time of incoming handover to an LTE cell, a functionality that is specific to EN-DC checks for coverage from target LTE anchor cell frequencies. This functionality uses B1 measurements to check for coverage from NR target frequencies, and uses A5 measurements (as defined in 3GPP standards) to check for coverage from target LTE anchor cell frequencies. If coverage from a suitable NR and LTE frequency combination is found, then handover is performed to the anchor LTE cell of the identified combination, and the B1 measurement report is forwarded to the target cell during the LTE handover. This handover is triggered for the purposes of EN-DC connectivity, and the operation occurs during mobility instances only, including incoming intra-frequency and inter-frequency handover.

When an EN-DC capable UE connected to an anchor LTE cell (with successfully added NR leg) comes to the edge of the NR cell coverage layer, the UE will experience poor NR Reference Signal Received Power (RSRP) with respect to the NR cell. According to currently standardized EN-DC procedures, two possible events can take place depending on the network configuration.

Figure 2:
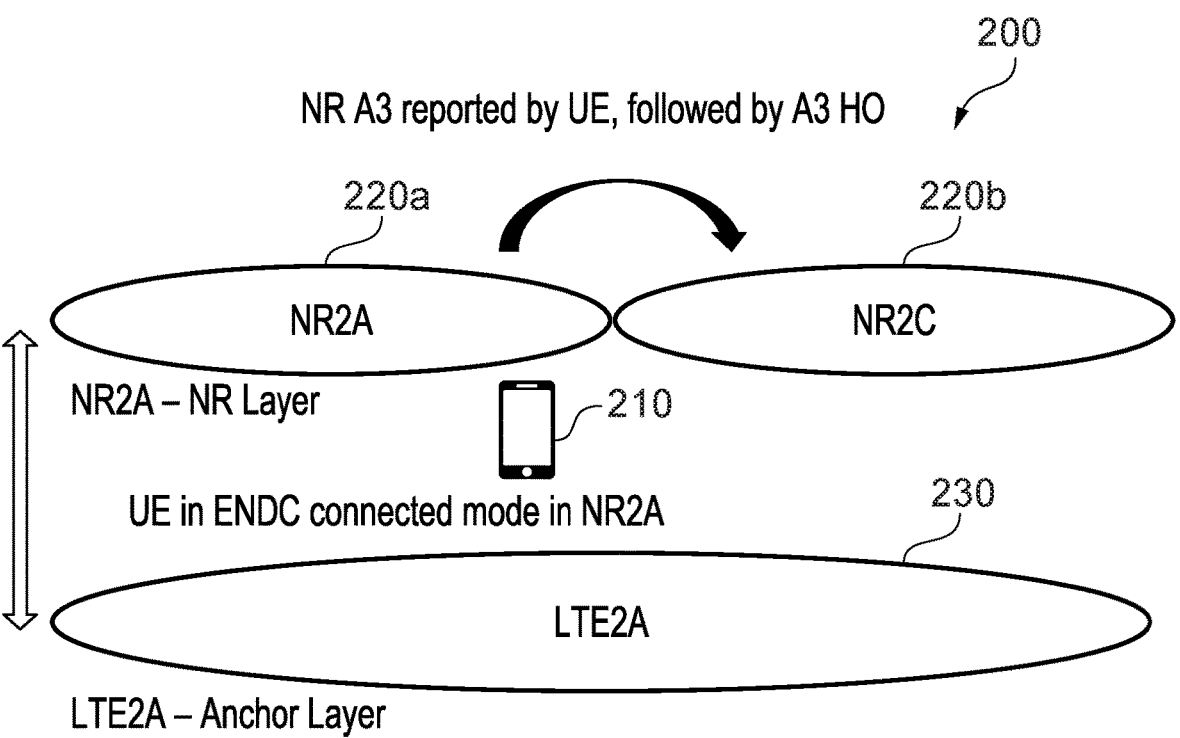
FIG. 2 illustrates another example of a network scenario.

FIG. 2 illustrates a first possible event that may take place, via a network scenario 200. Network scenario 200 comprises an ENDC capable UE 210 connected to LTE anchor cell 230 and first NR cell 220a. Network scenario 200 further comprises second NR cell 220b, which is operating on the same frequency layer as first NR cell 220a.

In network scenario 200, UE 210 is at the edge of first NR cell 220a and experiencing poor RSRP from the first NR cell 220a. Second NR cell 220b is operating on the same frequency layer as first NR cell 220a, is partially overlapping with first NR cell 220a, and shares the same LTE anchor cell 230 as first NR cell 220a. Under these circumstances, the UE 210 can send an A3 measurement report to the LTE anchor cell 230 to initiate an NR to NR A3 handover operation to connect to second NR cell 220b.

The second possible event that may take place when an EN-DC capable UE connected to an anchor LTE cell comes to the edge of NR cell coverage layer is a handover triggered for EN-DC connectivity during connected mode mobility. During an intra-frequency or inter-frequency LTE handover operation, a handover operation for EN-DC connectivity can occur in the following situations:

1) The LTE cell to which an LTE handover operation has occurred is not EN-DC capable i.e. cannot be used as an LTE anchor.

2) Owing to a UE capability limitation for LTE and NR band support, the current LTE cell is not suitable as an anchor, for example if the LTE/NR cell combination offered by the current LTE cell is not supported by the UE 3) The NR cell with the highest RSRP identified in the B1 report cannot be added as the secondary NR cell for the current LTE cell.

Under any of the above circumstances, after successful intra-frequency or inter-frequency LTE handover, a handover for EN-DC connectivity purposes may occur. During the handover, the UE performs a B1 measurement followed by an A5 Measurement, which causes the UE to move from the current LTE Cell to an LTE anchor cell for an NR leg setup operation. The EN-DC handover also ensures the presence of NR coverage in the target LTE anchor cell.

Figure 3:
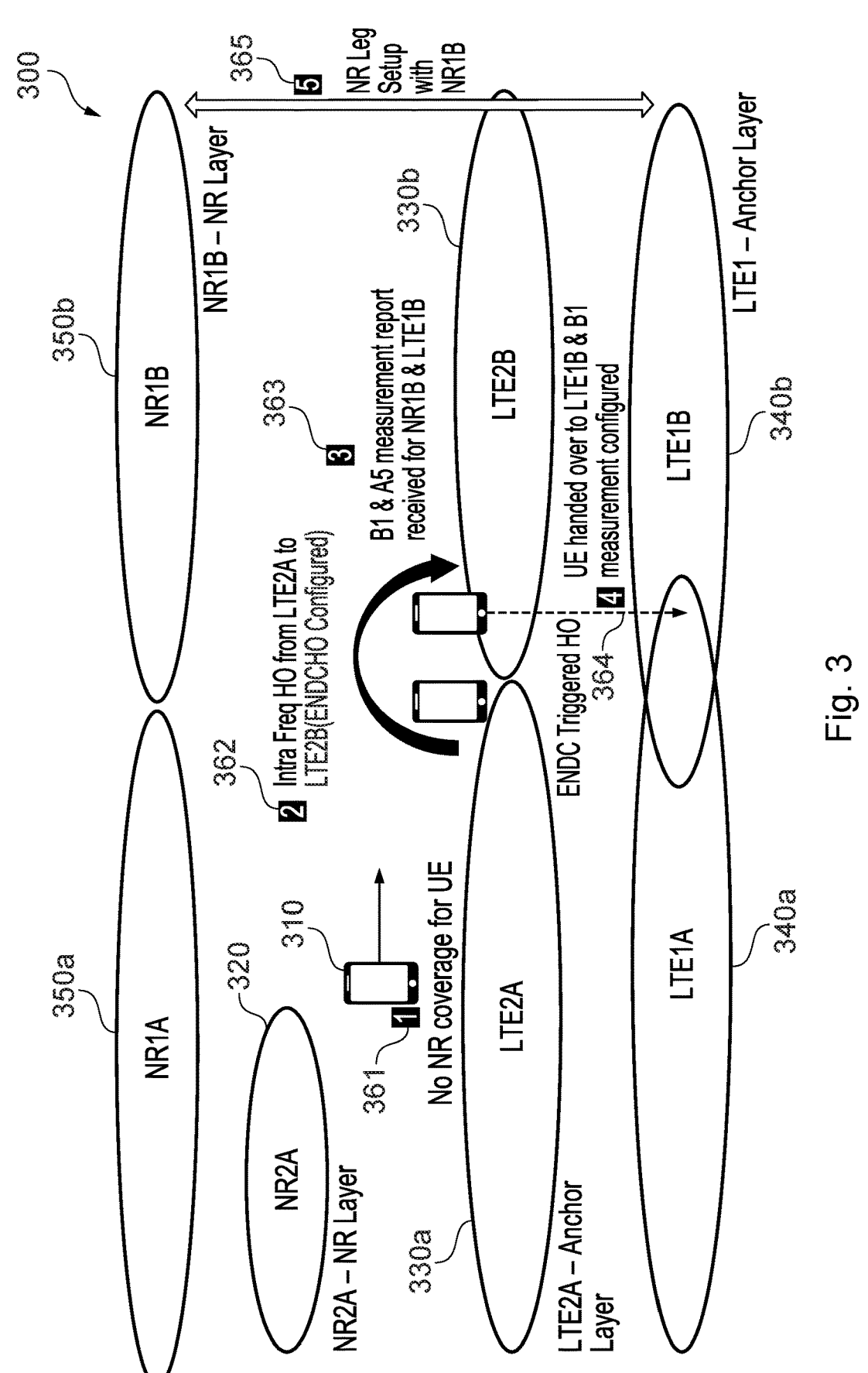
FIG. 3 illustrates another example of a network scenario.

FIG. 3 illustrates a network scenario 300 showing an example of a handover operation for EN-DC connectivity. Network scenario 300 comprises first and second LTE cells 340a, 340b, which are operating in an LTE lower frequency band LTE1. LTE1 acts as a coverage layer and can provide LTE anchors to the lower NR frequency band NR1 of first and second NR cells 350a, 350b. Network scenario 300 further comprises third and fourth LTE cells 330a, 330b, operating in the LTE higher frequency band LTE2. LTE2 may be an LTE capacity layer and operable to provide LTE anchors for the NR mid frequency band NR2 of third NR cell 320. The cells 230, 230a, 330b, 340a, 340b, 350a, 350b are labelled according to site names A and B. For example, LTE1A 340a defines a sector of site A transmitting the LTE1 frequency. LTE frequency layers LTE1, LTE2 are both EN-DC capable, but all frequency layers LTE1, LTE2 are not able to support all NR layers NR1, NR2 as an anchor, owing to UE capability restriction or network implementation strategy.

Network scenario 300 illustrates the UE 310 initially connected to third LTE anchor cell 330*a* and third NR cell 320, while gradually moving towards the cell edge of NR cell 320 in step 361. Once the RSRP from third NR cell 320 is below a threshold value, connection to the third NR cell 320 is released, and UE 310 continues with only LTE coverage provided by third LTE anchor cell 330*a*.

In step 362, the UE 310 reaches the edge of third LTE anchor cell 330*a*, and triggers an intra-frequency handover operation to fourth LTE cell 330*b*. During the LTE handover operation, a handover operation for EN-DC connectivity may occur if either of the following conditions is met:

a) Owing to UE capability limitation for LTE and NR band combination support, the fourth LTE cell 330*b* cannot be used as an LTE anchor cell for UE 310.

b) The NR cell identified in a B1 measurement report as providing the strongest RSRP cannot be added as a secondary cell with the fourth LTE cell 330*b* as the anchor cell.

In step 363, after successful intra-frequency handover to fourth LTE cell 330*b*, the UE reports a B1 measurement report including RSRP measurements to first NR cell 350*a* and second NR cell 350*b*. The UE also reports an A5 measurement report to fourth LTE cell 330*b* including RSRP measurements to first LTE cell 340*a* and second LTE cell 340*b*.

Once the UE 310 is able to measure the second NR cell 350*b* and second LTE cell 340*b*, and reports suitable B1 and A5 measurements, then in step 364, fourth LTE cell 330*b* initiates inter-frequency LTE handover from fourth LTE cell 330*b* to second LTE cell 340*b*. The NR B1 measurement report for second NR cell 350*b* is forwarded to the second LTE cell 340*b* and used for NR leg setup to connect the UE to second NR cell 350*b*.

Figure 4:
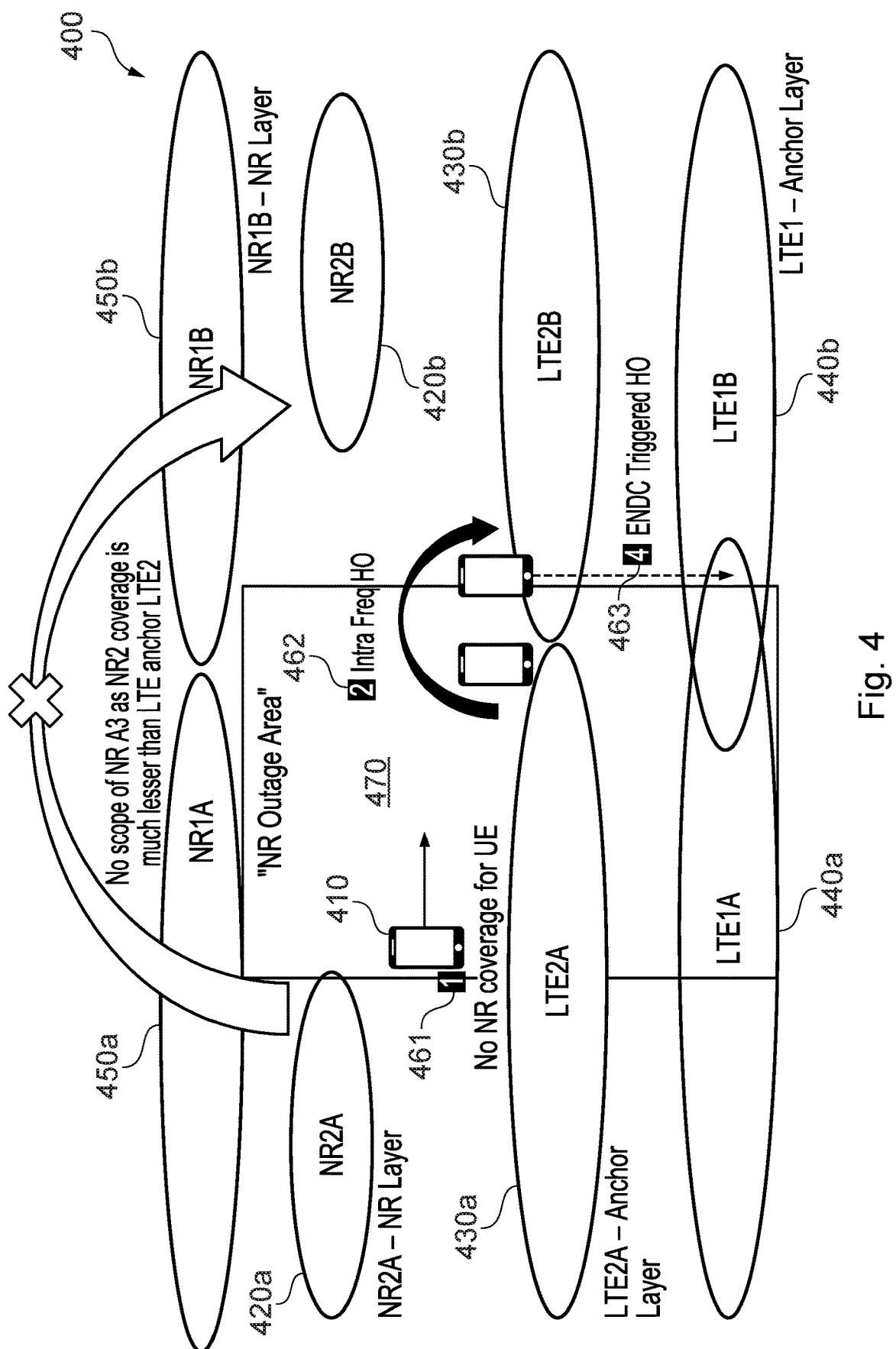
FIG. 4 illustrates another example of a network scenario.

Whilst the ENDC triggered handover described above can provide an NR connection for a UE, the procedure may still suffer a period where no ToNR is provided, as illustrated in FIG. 4.

FIG. 4 illustrates network scenario 400, which is substantially the same as the scenario 300 described above, with the addition of another NR cell 420*b* operating on the NR2 frequency band.

Network scenario 400 illustrates how even with an additional NR cell on the NR2 frequency band, and an ENDCHO in connected mode taking place as described above, a considerable NR outage area exists, in which the UE 410 has no NR connectivity, despite NR coverage being available from cells 450*a* and 450*b* in NR1. Prior to NR RLF at the edge of the coverage of NR cell 420*a*, there is no possibility of an NR A3 handover from NR cell 420*a* to NR cell 420*b*, owing to the absence of coverage overlap between the two NR cells. The combination of LTE cell 430 on LTE1 and NR cell 450*a* on NR2 is unsupported by the UE 410 (as discussed in further detail below), meaning that the UE cannot establish an NR leg with NR cell 450*a* while anchored to LTE cell 430*a*. The ENDCHO is triggered by LTE handover, and so takes place only as the UE performs handover between LTE cells. Consequently, following NR RLF there is no mechanism to trigger LTE handover, and ENDCHO, until the UE reaches the edge of its current anchor LTE cell.

Figure 5:
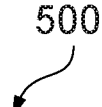
FIG. 5 illustrates an example of cell frequency band combinations.

As discussed above, UE capability for supporting different LTE and NR frequency band combinations plays an important role in the management of ToNR, and the existence of NR outage areas as illustrated in FIG. 4. FIG. 5 shows a table 500 of LTE and NR frequency combinations supported by the UE 410 in the scenario of FIG. 4. As illustrated, the UE supports two LTE and NR band combinations, meaning the UE can only access the NR1 frequency band when latched on to the LTE1 frequency band as anchor, and can only access the NR2 frequency band when latched on to the LTE2 frequency band as anchor. Network deployment setup may also influence the combination of different LTE and NR cells to which a UE may connect.

Examples of the present disclosure provide methods and apparatus that can reduce the size of NR outage coverage areas, improving ToNR for a UE.

FIG. 6 illustrates process steps in a computer-implemented method 600 for managing connectivity of a wireless device in a cellular communication network. The wireless device is operable to connect to a cell of a first radio-access technology (RAT) and to a cell of a second RAT. In some examples, the first RAT may comprise LTE and the second RAT cell may comprise NR. The method 600 may thus be operable to manage connectivity of the wireless device in an EN-DC architecture involving one or more LTE anchor cells and one or more NR secondary cells. The method 600 is performed by a management node, which may comprise a physical or virtual node, and may be implemented in a computing device or server apparatus and/or in a virtualized environment, for example in a cloud, edge cloud or fog deployment. In some examples, as discussed with reference to FIG. 24, the management node may comprise a functional module implemented in a virtualised control unit of a C-RAN (BBU office), vRAN (vBBU) or a disaggregated vRAN (vCU) as a centralised functional module.

Referring to FIG. 6, the method comprises in step 610, receiving, from a radio access node serving the wireless device, location information for the wireless device. The wireless device is connected to a first RAT cell hosted by the serving radio access node, and is also connected to a second RAT cell, and a signal strength of the second RAT cell, received at the wireless device, has fallen below a trigger threshold. In some examples, the wireless device may be EN-DC capable and be connected to an LTE cell and an NR cell of a 3GPP network. In some examples, signal strength may be indicated by an RSRP measurement, and the radio access node may become aware that a signal strength of the second RAT cell has fallen below the threshold based on an A2 measurement report received at the radio access node from the wireless device. In some examples, the radio access node may transmit the location information to the management node in response to receiving the A2 measurement report.

The method 600 further comprises, in step 620, identifying first RAT cells in the communication network that are neighbours of the first RAT cell to which the wireless device is connected, and identifying second RAT cells in the communication network that are neighbours of the identified first RAT cells. Neighbourhood relationships may be defined by the topology of the communication network, and in some examples, the radio access node serving the wireless device may transmit at least information identifying the first RAT cells that are neighbours of the first RAT cell to which the wireless device is connected, and possibly also information identifying the second RAT cells in the communication network that are neighbours of the identified first RAT cells, to the management node. In other examples the management node may obtain information identifying the appropriate neighbour cells from a suitable repository, for example of centrally available network information.

The method 600 further comprises, in step 630, assembling, from the identified first RAT cells and second RAT cells, a candidate set of cell combinations, wherein each cell combination in the candidate set comprises a pair of a first RAT cell and a second RAT cell to which the wireless device is operable to connect. In some examples, the pairs of the candidate set of cell combinations may comprise an LTE cell and an NR cell capable of providing an EN-DC connection for the wireless device.

The method further comprises, in step 640, for cell combinations in the candidate set, using a Machine Learning (ML) model to predict a received signal strength at the wireless device of the first RAT cells and the second RAT cells of the cell combinations, based on the received location information for the wireless device. In some examples, the ML model may predict RSRP values for each cell of the cell combinations based on the location data of the wireless device. The ML model may for example be trained using historic RSRP and wireless device location data.

The method 600 further comprises, in step 650, identifying, from the candidate set of cell combinations, a cell combination for which the predicted received signal strengths of the first RAT cell and the second RAT cell of the combination satisfy an operational criterion. The operational criterion is discussed in further detail below with reference to FIGS. 7*a-e*, and may be specified so as to maximise connectivity on the second RAT. For example, for all cell combinations in which the first RAT cell can be received by the wireless device with an acceptable signal strength (above a threshold value), the operational criterion may specify selection of that combination in which the second RAT cell can be received by the UE with the highest signal strength.

The method further comprises, in step 660, causing the radio access node serving the wireless device to initiate handover of the wireless device to the first RAT cell of the identified cell combination. In some examples, the handover to the first RAT cell of the identified cell combination may comprise an inter-frequency or intra-frequency LTE handover operation. In some examples, following the LTE handover operation, the wireless device may perform an EN-DC NR leg set up operation to connect to an NR cell, which may be the NR cell of the identified cell combination.

As discussed in more detail below, the method 600 may be operable to initiate an early handover operation when a wireless device is about to lose service on an NR cell. The method may further ensure that the handover that is carried out is to an anchor LTE cell that can pair with a suitable NR cell, so promoting continuity of NR service, without requiring additional handovers. By initiating handover before the wireless device reaches the edge of the coverage area of its serving anchor cell, and ensuring that the LTE handover that takes place is to a cell that is suitable to anchor for the optimal NR cell, the NR outage area for the wireless device may be significantly reduced, and handover operations may be minimised, saving valuable network resources.

FIGS. 7*a-e* show a flow chart illustrating process steps in another example of a computer implemented method 700 for managing connectivity of a wireless device in a cellular communication network. As for the method 600 above, the method 700 is performed by a management node, which may comprise a physical or virtual node, and may be implemented in a computing device or server apparatus and/or in a virtualized environment, for example in a cloud, edge cloud or fog deployment. The method 700 provides one example of how the steps of the method 600 may be implemented and supplemented to achieve the above discussed and additional functionality.

Figure 7A:
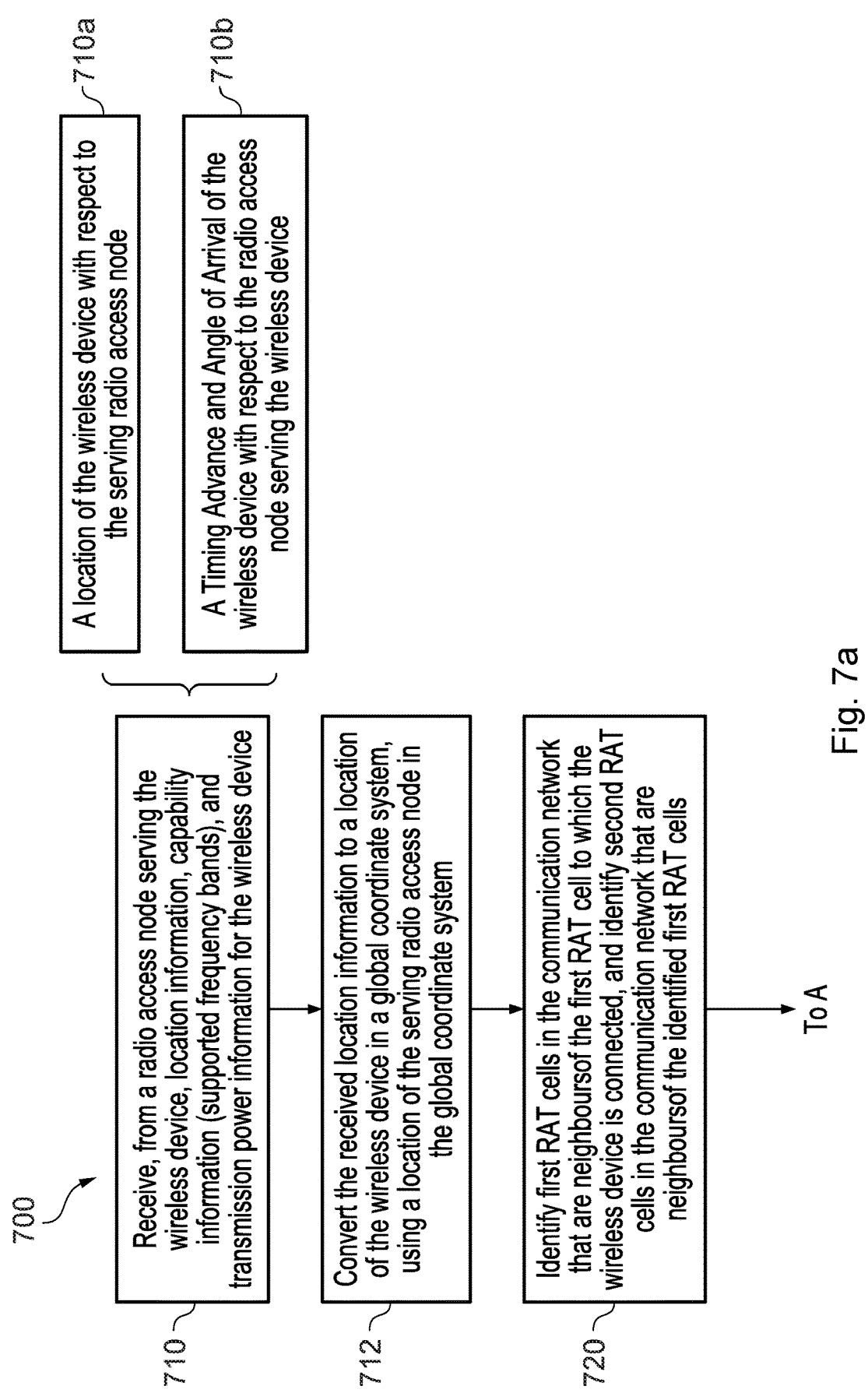

Referring initially to FIG. 7*a*, in step 710 the management node initially receives, from a radio access node serving the wireless device, location information for the wireless device. The received location information for the wireless device may, as illustrated at 710*a*, provide a location of the wireless device with respect to the serving radio access node. For example, the location information may comprise, as illustrated at 710*b*, a Timing Advance and Angle of Arrival of the wireless device with respect to the radio access node serving the wireless device. The management node may additionally receive, from the radio access node serving the wireless device, capability information for the wireless device, wherein the capability information comprises frequency band combinations supported by the wireless device, and transmission power information for the wireless device. The transmission power information may for example be the device power headroom. The capability information and power information may be received from the radio access node at the same time, and for example in the same transmission, as the location information, the transmission of location, power and capability information being triggered by signal strength of the second RAT cell falling below the trigger threshold. In other examples, at least one of the capability information and/or power information may be transmitted separately, and/or at another time.

In step 712, the management node converts the received location information to a location of the wireless device in a global coordinate system, using a location of the serving radio access node in the global coordinate system. In some examples, the location of the wireless device in the global coordinate system may comprise a longitude and latitude of the wireless device. Details of one example of how this conversion may be performed are provided below, with reference to FIG. 14.

In step 720, the management node identifies first RAT cells in the communication network that are neighbours of the first RAT cell to which the wireless device is connected, and identifies second RAT cells in the communication network that are neighbours of the identified first RAT cells. As discussed above, neighbourhood relationships may be defined by the topology of the communication network, and in some examples, the radio access node serving the wireless device may transmit information identifying the first RAT cells that are neighbours of the first RAT cell to which the wireless device is connected, and may also transmit information identifying the second RAT cells in the communication network that are neighbours of the identified first RAT cells, to the management node. In other examples the management node may obtain information identifying the appropriate neighbour cells from a suitable repository of available network information or any other source.

Referring now to FIG. 7*b*, in step 730, the management node assembles, from the identified first RAT cells and second RAT cells, a candidate set of cell combinations, wherein each cell combination in the candidate set comprises a pair of a first RAT cell and a second RAT cell to which the wireless device is operable to connect. A pair of a first RAT cell and a second RAT cell to which the wireless device is operable to connect may comprise, as illustrated at 730*a-c*, a pair in which the first RAT cell is operating on a first frequency band 730*a*, the second RAT cell is operating on a second frequency band 730*b*, and the combination of the first frequency band and the second frequency band is a combination that is supported by the wireless device. As illustrated at 730*e* and discussed above, the first RAT may comprise 3GPP LTE, and the second RAT may comprise 3GPP NR, in which case the cells of the combinations should also be EN-DC capable.

As illustrated at 730*d*, and consistent with the above discussed description of what constitutes a pair of cells to which the wireless device is operable to connect, the step of assembling the candidate set may comprise populating the candidate set with only those combinations of first RAT cells and second RAT cells whose frequency band combinations are supported by the wireless device. The supported frequency band combinations may be obtained from the capability information received at step 710.

Referring now to FIG. 7*c*, in step 740, the management node uses an ML model to predict a received signal strength at the wireless device of the first RAT cells and the second RAT cells of the cell combinations in the candidate set, based on the received location information for the wireless device. As illustrated in FIG. 7*c*, this may comprise performing steps 740*a-c* for each of the first RAT cells and second RAT cells of the cell combinations in the candidate set. In step 740*a*, the management node generates, from the location information for the wireless device, a location of the wireless device with respect to the radio access node hosting the cell under consideration. As illustrated at 740*a*, this may comprise converting the location of the wireless device in the global coordinate system (generated from the received location information in step 712) to a location of the wireless device with respect to the radio access node hosting the cell under consideration. This conversion may be performed using a location in the global coordinate system of the radio access node hosting the cell under consideration. The location of the wireless device with respect to the radio access node hosting the cell may comprise a Timing Advance and Angle of Arrival of the wireless device with respect to the radio access node, and the conversion process may substantially mirror that used to convert the received location information to a global coordinate system in step 712. An example of this process is discussed below with reference to FIG. 17.

In step 740*b*, the management node inputs, to a trained ML model for the cell under consideration, the generated location of the wireless device with respect to the radio access node hosting the cell, wherein the trained ML model for the cell is operable to process the input location in accordance with its trained parameters. In step 740*c*, the management node obtains from the trained ML model for the cell an output comprising the predicted signal strength of the cell that would be received by the wireless device in the represented location. As illustrated at 740*d*, for each cell, the trained ML model for the cell may be trained using historic received signal strength measurements and wireless device locations with respect to the radio access node hosting the cell. For example, reported measured RSRP values, together with the TA and AoA of wireless devices reporting the RSRP values, may be added to a training data set during a period of operation of the communication network. The period of operation may be of sufficient length to encompass periodic variations in communication network use, user mobility patterns etc., in order to build a training data set that the contains at least a threshold amount of data, and/or that is characterised by statistical parameters suggesting that a model of acceptable accuracy may be obtained using the training data set. In one example, the ML models for the various neighbour cells may comprise Random Forrest models, as discussed in further detail below. As the predicted quantity is a continuous variable, a regression model is particularly suited to this task, and other examples of suitable ML model and model architectures include Decision Trees and, k-Nearest Neighbours (KNN) regression. Neural Networks can also be used as the ML models for the various neighbour cells.

In step 740*e*, the management node may calculate various functions of the predicted received signal strengths, such as normalised versions and/or normalised and weighted versions of the predicted signal strengths. These functions are discussed in further detail below with reference to method step 750.

Figure 7D:
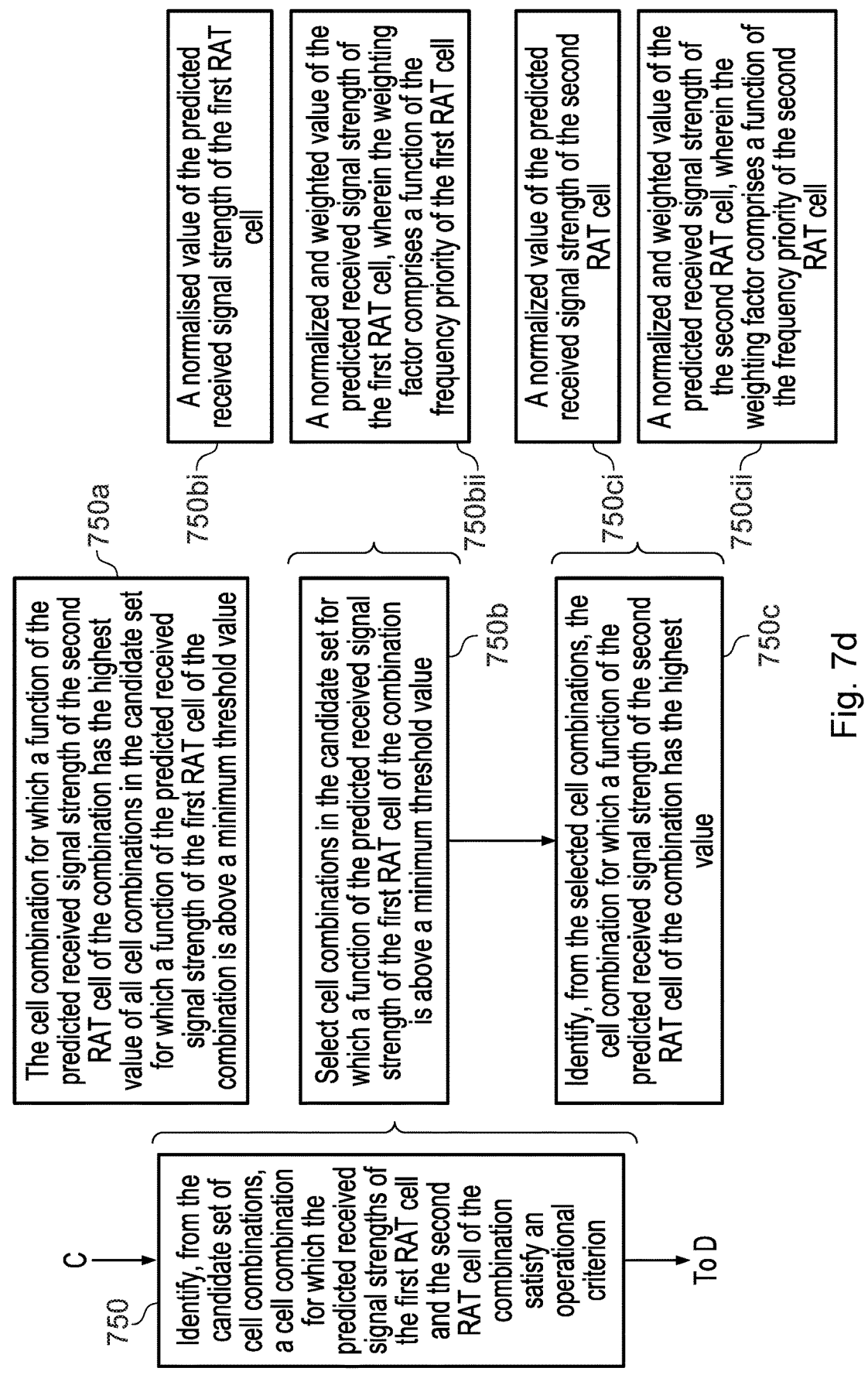

Referring now to FIG. 7*d*, in step 750 the management node identifies, from the candidate set of cell combinations, a cell combination for which the predicted received signal strengths of the first RAT cell and the second RAT cell of the combination satisfy an operational criterion. The operational criterion is designed according to network operator priorities, and may be defined so as to both minimise a time in which the wireless device is without connectivity on the second RAT, and to minimise handover procedures for the wireless device. In one example, as illustrated at 750*a*, a cell combination that satisfies the operational criterion comprises the cell combination for which a function of the predicted received signal strength of the second RAT cell of the combination has the highest value of all cell combinations in the candidate set for which a function of the predicted received signal strength of the first RAT cell of the combination is above a minimum threshold value.

In accordance with the discussion at 750*a*, identifying a cell combination for which the predicted received signal strengths of the first RAT cell and the second RAT cell of the combination satisfy the operational criterion may comprise:

in step 750*b*, selecting cell combinations in the candidate set for which a function of the predicted received signal strength of the first RAT cell of the combination is above a minimum threshold value; and in step 750*c*, identifying, from the selected cell combinations, the cell combination for which a function of the predicted received signal strength of the second RAT cell of the combination has the highest value.

As discussed above, the functions of the predicted received signal strength may have been calculated in step 740*e*. As illustrated at 750*bi* and 750*bii*, the function of the predicted received signal strength of the first RAT cell may comprise a normalised value of the predicted received signal strength of the first RAT cell, or a normalized and weighted value of the predicted received signal strength of the first RAT cell, wherein the weighting factor comprises a function of the frequency priority of the first RAT cell. The normalised value may be normalised with respect to a mean value for all predicted signal strengths of first RAT cells. The function of the frequency priority may be the frequency priority normalised to be in the range [0, 1]. In some examples, a cell offset may be added or subtracted before normalising, according to operator preference. The value of the calculated function of the predicted received signal strengths for each first RAT cell may be considered as a score representing the desirability of the cell as an anchor cell for the wireless device. The score may be normalised for ease of comparison, and may take account of the priority value of the frequency on which the cell is operating.

As illustrated at 750*ci* and 750*cii*, the function of the predicted received signal strength of the second RAT cell may comprise a normalised value of the predicted received signal strength of the second RAT cell, or a normalized and weighted value of the predicted received signal strength of the second RAT cell, wherein the weighting factor comprises a function of the frequency priority of the second RAT cell. The normalised value may be normalised with respect to a mean value for all predicted signal strengths of second RAT cells. The function of the frequency priority may be the frequency priority normalised to be in the range [0, 1]. In some examples, a cell offset may be added or subtracted before normalising, according to operator preference. As for the first RAT cells, the value of the calculated function of the predicted received signal strengths for each second RAT cell may be considered as a score representing the desirability of the cell as an anchor cell for the wireless device. The score may be normalised for ease of comparison, and may take account of the priority value of the frequency on which the cell is operating.

Figure 7E:
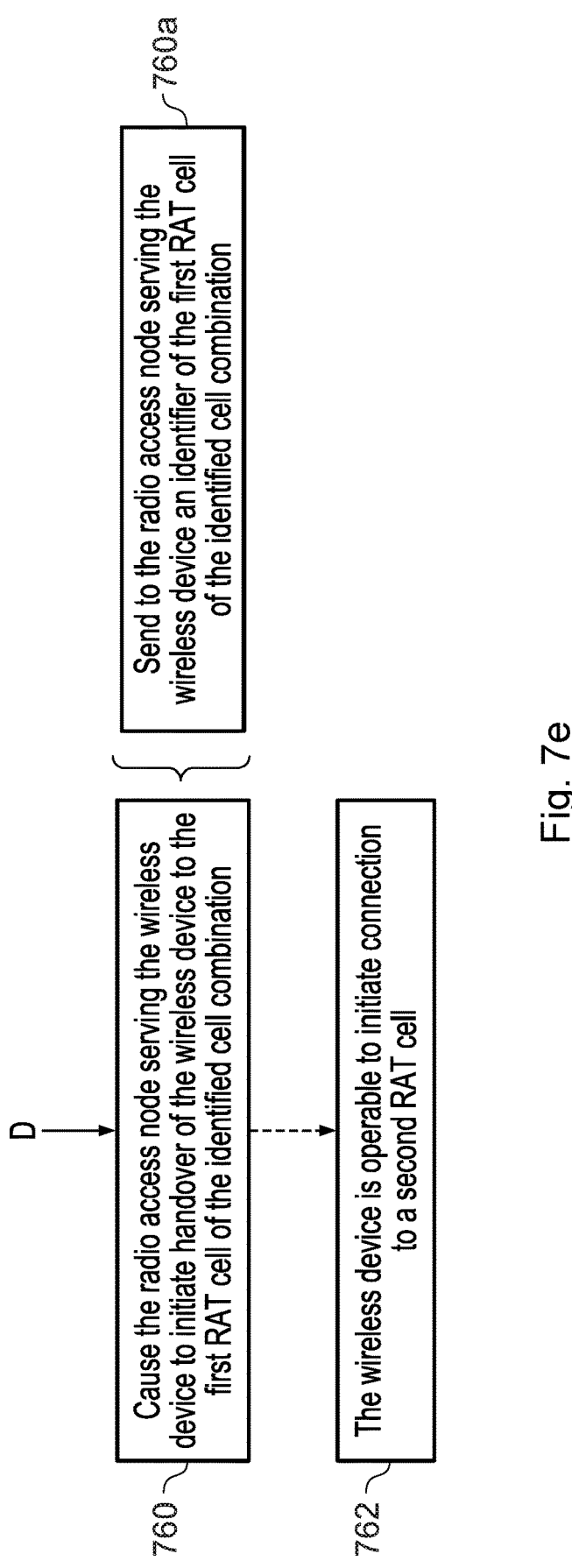

Referring now to FIG. 7e, in step 760, the management node causes the radio access node serving the wireless device to initiate handover of the wireless device to the first RAT cell of the identified cell combination. As illustrated at 760a, this may comprise sending to the radio access node serving the wireless device an identifier of the first RAT cell of the identified cell combination. Following handover to a new first RAT cell, the wireless device is then operable to initiate connection to a second RAT cell. In the case of LTE and NR cells, the connection may be initiated on the basis of a B1 measurement by the wireless device. In a majority of operational scenarios, the B1 measurement will report the strongest received signal strength from the second RAT cell that was part of the identified combination. However, it may be envisaged that the second RAT cell of the combination could be experiencing a fault, temporarily out of service for maintenance or unavailable for some other reason. In such cases the wireless device may be able to initiate connection to another second RAT cell detectable by the wireless device.

The methods 600, 700 may be complemented by a method performed at a radio access node.

FIG. 8 illustrates process steps in a computer-implemented method 800 for managing connectivity of a wireless device in a cellular communication network. The wireless device is operable to connect to a cell of a first RAT and to a cell of a second RAT. The method is performed by a radio access node hosting a first RAT cell to which the wireless device is connected. According to examples of the present disclosure, a radio access node comprises a node that is operable to transmit, receive, process and/or orchestrate wireless signals. A radio access node may comprise a physical node and/or a virtualised network function. In some examples, a radio access node may comprise a base station node such as a NodeB, eNodeB, gNodeB, or any future implementation of this functionality.

Referring to FIG. 8, the method 800 comprises, in step 810, receiving, from the wireless device, an indication that the received signal strength of a second RAT cell, to which the wireless device is also connected, has fallen below a trigger threshold. For example, the radio access node may receive an A2 measurement report, as standardised in 3GPP, indicating that an RSRP of the second RAT cell has fallen below a threshold value. In step 820, the method 800 further comprises transmitting, to a management node, location information for the wireless device. The management node is configured to identify a cell combination comprising a pair of a first RAT cell and a second RAT cell to which the wireless device is operable to connect and which combination satisfies an operational criterion. The management node may thus be operable to provide some combination of the functionality discussed above with reference to methods 600, 700.

Referring still to FIG. 8, method 800 further comprises, in step 830, responsive to a prompt from the management node, initiating handover of the wireless device to the first RAT cell of the identified cell combination. In some examples, the prompt may comprise information identifying the first RAT cell of the identified cell combination. The handover may comprise an inter-frequency or intra-frequency LTE handover operation.

Figure 9:
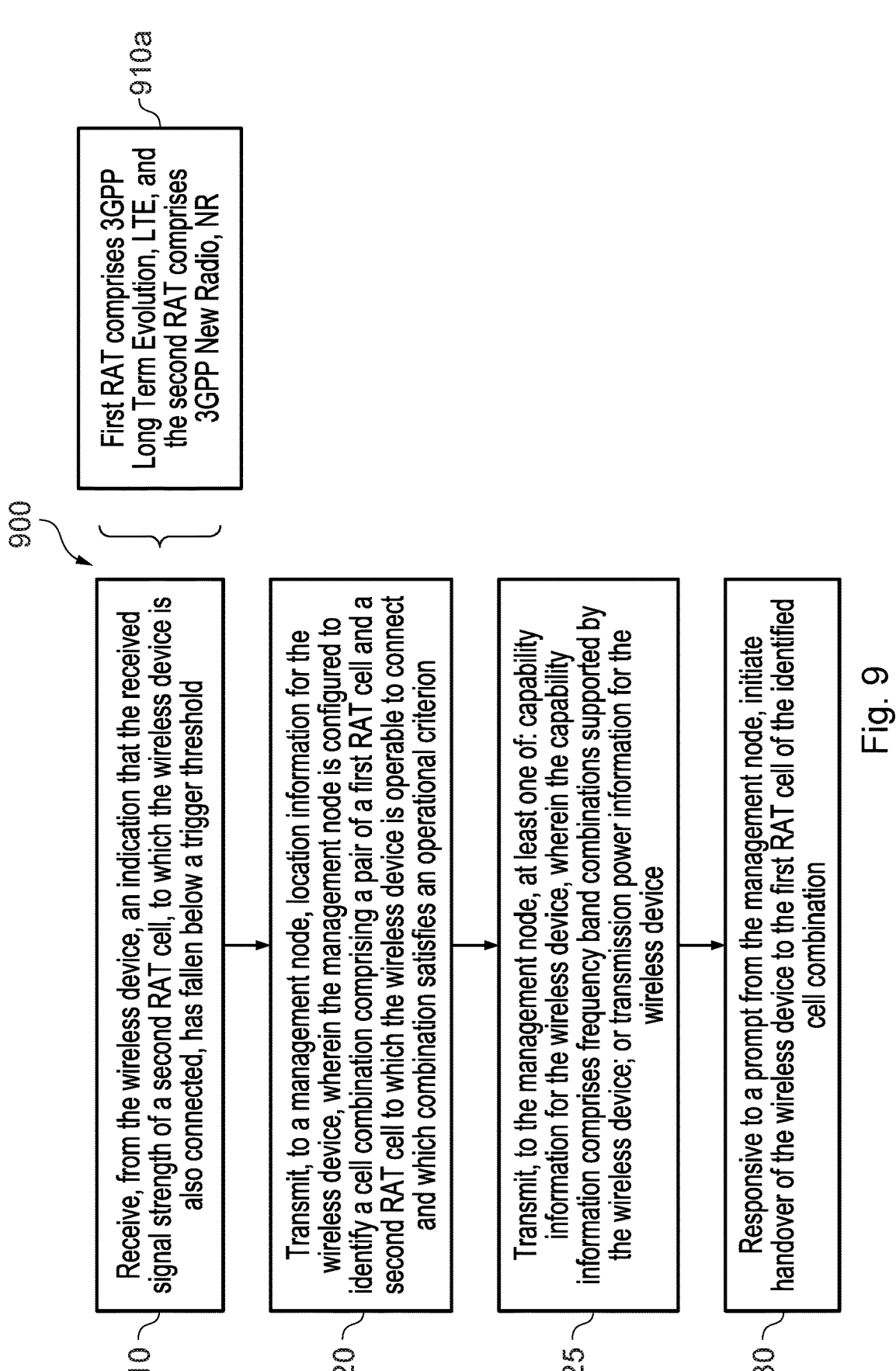
FIG. 9 is a flow chart illustrating process steps in another computer implemented method for managing connectivity of a wireless device in a cellular communication network.

FIG. 9 shows a flow chart illustrating process steps in another example of a computer implemented method 900 for managing connectivity of a wireless device in a cellular communication network. As for the method 800 above, the method 900 is performed by a radio access node hosting a first RAT cell to which the wireless device is connected. The radio access node may comprise a physical node and/or a virtualised network function and may for example comprise a NodeB, eNodeB, gNodeB, or any future implementation of this functionality. The method 900 provides one example of how the steps of the method 800 may be implemented and supplemented to achieve the above discussed and additional functionality.

Referring to FIG. 9, as illustrated at 910, the first RAT may comprise 3GPP LTE and the second RAT may comprise 3GPP NR. In step 910, the radio access node receives from the wireless device an indication that the received signal strength of a second RAT cell, to which the wireless device is also connected, has fallen below a trigger threshold. As discussed above, this indication may comprise a suitable measurement report, such as an A2 measurement report. In step 920, the radio access node transmits location information for the wireless device to a management node, which may for example comprise a centralised function, for example implemented in a cloud deployment. As discussed above, the management node is configured to identify a cell combination comprising a pair of a first RAT cell and a second RAT cell to which the wireless device is operable to connect and which combination satisfies an operational criterion. The management node may be operable to carry out steps of the method 600 and/or 700.

The location information for the wireless device may, as discussed above with reference to the method 700, provide a location of the wireless device with respect to the serving radio access node. For example, the location information may comprise a Timing Advance and Angle of Arrival of the wireless device with respect to the radio access node. In step 925, the radio access node transmits to the management node at least one of: capability information for the wireless device or transmission power information for the wireless device. The capability information comprises frequency band combinations supported by the wireless device. In some examples, the transmission power information may comprise a power headroom of the wireless device, which in some examples may be indicated in an A2 measurement report received from the wireless device at the radio access node.

In some examples, the radio access node may be configured to transmit the capability information and/or the transmission power information together with the location information transmitted in step 920. The capability and/or power information may be transmitted in response to receiving the indication that the received signal strength of a second RAT cell, to which the wireless device is also connected, has fallen below the trigger threshold, as specified in step 920. In some examples the radio access node may be configured to transmit the capability information and/or the transmission power information in the same transmission as the location information.

In step 930, responsive to a prompt from the management node, the radio access node initiates handover of the wireless device to the first RAT cell of the cell combination identified by the management node. In some examples, the prompt may comprise information identifying the first RAT cell of the identified cell combination. The handover may comprise an inter-frequency or intra-frequency LTE handover operation.

As discussed above, the methods 600 and 700 may be performed by a management node, and the present disclosure provides a management node that is adapted to perform any or all of the steps of the above discussed methods. The management node may be a physical or virtual node, and may for example comprise a virtualised function that is running in a cloud, edge cloud or fog deployment. The management node may for example comprise or be instantiated in any part of a logical core network node, network management centre, network operations centre, Radio Access node etc. Any such communication network node may itself be divided between several logical and/or physical functions, and any one or more parts of the management node may be instantiated in one or more logical or physical functions of a communication network node.

Figure 10:
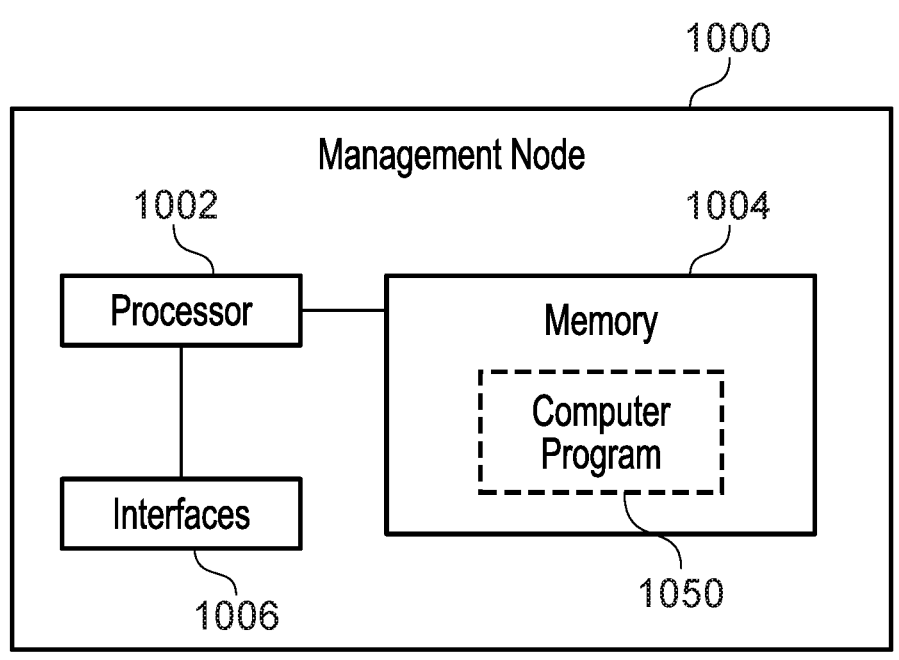
FIG. 10 is a block diagram illustrating functional modules in a management node.

FIG. 10 is a block diagram illustrating an example management node 1000 which may implement the method 600 and/or 700, as illustrated in FIGS. 6 and 7, according to examples of the present disclosure, for example on receipt of suitable instructions from a computer program 1050. Referring to FIG. 10, the management node 1000 comprises a processor or processing circuitry 1002, and may comprise a memory 1004 and interfaces 1006. The processing circuitry 1002 is operable to perform some or all of the steps of the methods 600 and/or 700 as discussed above with reference to FIGS. 6 and 7. The memory 1004 may contain instructions executable by the processing circuitry 1002 such that the management node 1000 is operable to perform some or all of the steps of the method 600 and/or 700 as discussed above with reference to FIGS. 6 and 7. The instructions may also include instructions for executing one or more telecommunications and/or data communications protocols. The instructions may be stored in the form of the computer program 1050. In some examples, the processor or processing circuitry 1002 may include one or more microprocessors or microcontrollers, as well as other digital hardware, which may include digital signal processors (DSPs), special-purpose digital logic, etc. The processor or processing circuitry 1002 may be implemented by any type of integrated circuit, such as an Application Specific Integrated Circuit (ASIC), Field Programmable Gate Array (FPGA) etc. The memory 1004 may include one or several types of memory suitable for the processor, such as read-only memory (ROM), random-access memory, cache memory, flash memory devices, optical storage devices, solid state disk, hard disk drive etc. The management node 1000 may further comprise interfaces 1010 which may be operable to facilitate communication with a radio access node and/or with other communication network nodes over suitable communication channels.

As discussed above, the methods 800 and 900 may be performed by a radio access node, and the present disclosure provides a radio access node that is adapted to perform any or all of the steps of the above discussed methods. The radio access node may be a physical or virtual node, and may for example comprise a virtualised function that is running in a cloud, edge cloud or fog deployment. The radio access node may for example comprise or be instantiated in any part of a logical base station node such as a NodeB, eNodeB, gNodeB, or any future implementation of this functionality. Any such base station node may itself be divided between several logical and/or physical functions, and any one or more parts of the radio access node may be instantiated in one or more logical or physical functions of a base station node.

Figure 11:
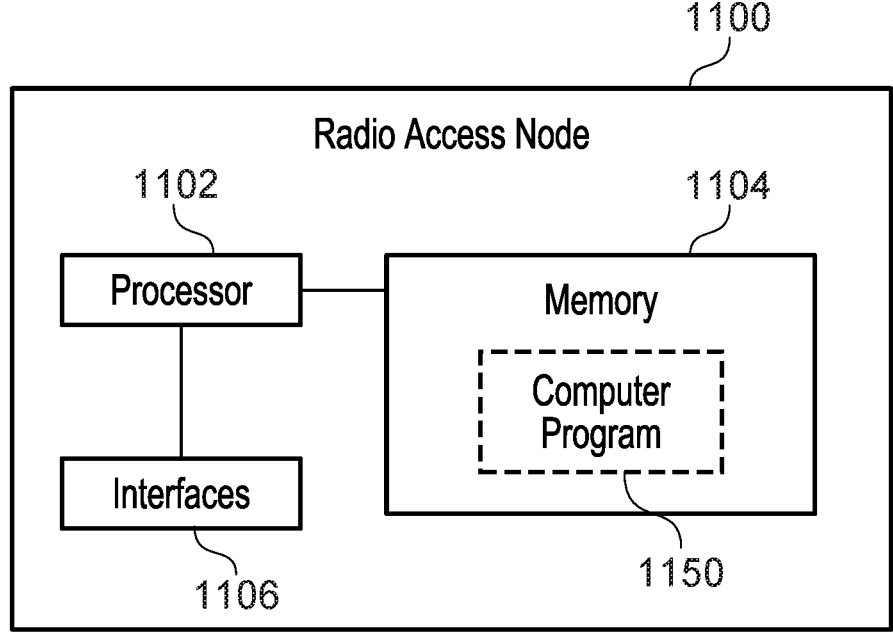
FIG. 11 is a block diagram illustrating functional modules in a radio access node.

FIG. 11 is a block diagram illustrating an example radio access node 1100 which may implement the method 100 and/or 200, as illustrated in FIGS. 8 and 9, according to examples of the present disclosure, for example on receipt of suitable instructions from a computer program 1150. Referring to FIG. 11, the radio access node 1100 comprises a processor or processing circuitry 1102, and may comprise a memory 1104 and interfaces 1106. The processing circuitry 1102 is operable to perform some or all of the steps of the method 800 and/or 900 as discussed above with reference to FIGS. 8 and 9. The memory 1104 may contain instructions executable by the processing circuitry 1102 such that the radio access node 1100 is operable to perform some or all of the steps of the method 800 and/or 900, as illustrated in FIGS. 8 and 9. The instructions may also include instructions for executing one or more telecommunications and/or data communications protocols. The instructions may be stored in the form of the computer program 1150. In some examples, the processor or processing circuitry 1102 may include one or more microprocessors or microcontrollers, as well as other digital hardware, which may include digital signal processors (DSPs), special-purpose digital logic, etc. The processor or processing circuitry 1102 may be implemented by any type of integrated circuit, such as an Application Specific Integrated Circuit (ASIC), Field Programmable Gate Array (FPGA) etc. The memory 1104 may include one or several types of memory suitable for the processor, such as read-only memory (ROM), random-access memory, cache memory, flash memory devices, optical storage devices, solid state disk, hard disk drive etc. The radio access node 1100 may further comprise interfaces 1106 which may be operable to facilitate communication with a management node, and/or with other communication network nodes over suitable communication channels.

According to another aspect of the present disclosure, there is provided a management node for managing connectivity of a wireless device in a cellular communication network wherein the wireless device is operable to connect to a cell of a first radio-access technology (RAT) and to a cell of a second RAT. The management node comprises a receiving module for receiving, from a radio access node serving the wireless device, location information for the wireless device, wherein the wireless device is connected to a first RAT cell hosted by the serving radio access node, and is also connected to a second RAT cell, and wherein a signal strength of the second RAT cell, received at the wireless device, has fallen below a trigger threshold. The management node also comprises a neighbour module for identifying first RAT cells in the communication network that are neighbours of the first RAT cell to which the wireless device is connected, and identifying second RAT cells in the communication network that are neighbours of the identified first RAT cells. The management node also comprises an candidate module for assembling, from the identified first RAT cells and second RAT cells, a candidate set of cell combinations, wherein each cell combination in the candidate set comprises a pair of a first RAT cell and a second RAT cell to which the wireless device is operable to connect. The management node also comprises a learning module for using an ML model, for cell combinations in the candidate set, to predict a received signal strength at the wireless device of the first RAT cells and the second RAT cells of the cell combinations, based on the received location information for the wireless device. The management node also comprises an identifying module for identifying, from the candidate set of cell combinations, a cell combination for which the predicted received signal strengths of the first RAT cell and the second RAT cell of the combination satisfy an operational criterion. The management node also comprises an initiating module for causing the radio access node serving the wireless device to initiate hand over of the wireless device to the first RAT cell of the identified cell combination. The management node may further comprise interfaces which may be operable to facilitate communication with any other communication network nodes over suitable communication channels. The functional modules of the management node may be realised in any appropriate combination of hardware and/or software. The modules may comprise one or more processors and may be integrated to any degree.

According to another aspect of the present disclosure, there is provided a radio access node for managing connectivity of a wireless device in a cellular communication network, wherein the wireless device is operable to connect to a cell of a first RAT and to a cell of a second RAT. The radio access node comprises a receiving module for receiving, from the wireless device, an indication that the received signal strength of a second RAT cell, to which the wireless device is also connected, has fallen below a trigger threshold. The radio access node also comprises a transmitting module for transmitting, to a management node, location information for the wireless device, wherein the management node is configured to identify a cell combination comprising a pair of a first RAT cell and a second RAT cell to which the wireless device is operable to connect and which combination satisfies an operational criterion. The radio access node also comprises an initiating module for, responsive to a prompt from the management node, initiating handover of the wireless device to the first RAT cell of the identified cell combination. The radio access node may further comprise interfaces which may be operable to facilitate communication with any other communication network nodes over suitable communication channels. The functional modules of the radio access node may be realised in any appropriate combination of hardware and/or software. The modules may comprise one or more processors and may be integrated to any degree.

Figure 12:
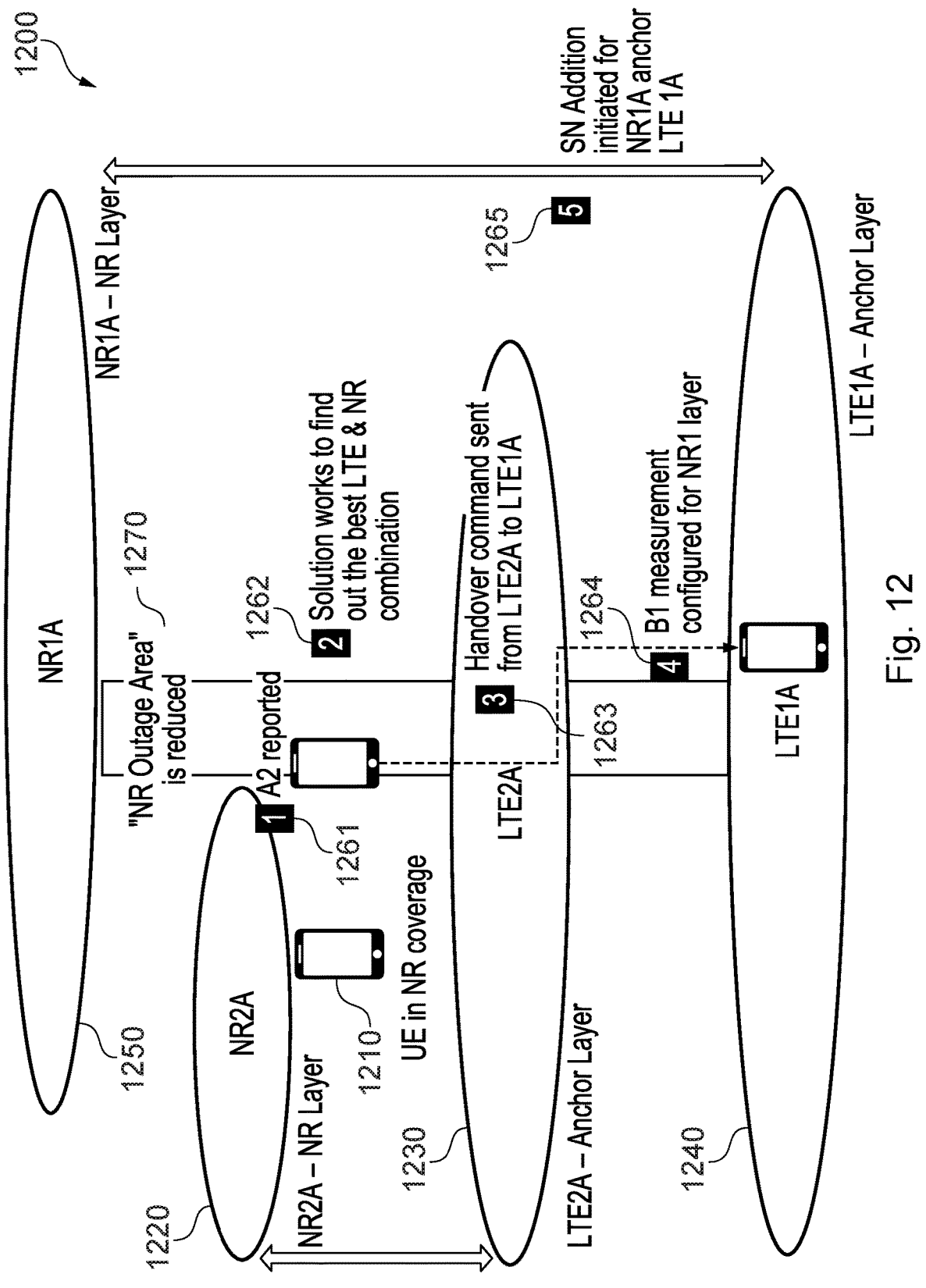
FIG. 12 illustrates another example of a network scenario.

FIG. 12 illustrates a network scenario 1200 showing a handover operation in a 3GPP network according to examples of the present disclosure. FIG. 12 illustrates how example methods according to the present disclosure may reduce the NR outage area, when compared for example with the network scenario of FIG. 4. With reference to the methods 600 to 900, in the network scenario of FIG. 12, the first RAT comprises LTE and the second RAT comprises NR.

Referring to FIG. 12, Network scenario 1200 comprises UE 1210, first LTE cell 1240, second LTE cell 1230, first NR cell 1250 and second NR cell 1220. The first LTE cell 1240 and first NR cell 1250 operate on LTE1 and NR1 frequency bands respectively, a frequency band combination that is supported by the UE 1210. The second LTE cell 1230 and second NR cell 1220 operate on LTE2 and NR2 frequency bands respectively, also a combination supported by the UE 1210. In a first step 1261, UE 1210 is within the coverage area of second LTE cell 1230 and second NR cell 1220. These cells represent a supported frequency band combination, and the UE 1210 is connected to the second LTE cell 1230 as anchor cell and the second NR cell 1220 as secondary cell for NR connectivity. In step 1261, the UE reaches the edge of the coverage area of second NR cell 1210 and transmits an A2 measurement report to first LTE cell 1230, indicating that a signal strength of the second NR cell 1220 has fallen below a signal strength threshold.

In step 1262, second LTE cell 1230 transmits UE location information to a management node that is operable to identify an optimal EN-DC capable LTE cell and NR cell combination for the UE to connect to. The management node carries out a method according to the present disclosure, predicting the signal strength, at the UE's location, for EN-DC capable cells to which the UE can connect. The management node identifies the combination of LTE and NR cells for the UE by assessing possible combinations against an operational criterion and identifying the combination which satisfies the operational criterion. In the illustrated scenario, the management node identifies the combination of first LTE cell 1240 and first NR cell 1250. The management node provides the identity of the LTE cell of the identified combination (first LTE cell 1240) to the second LTE cell 1230. The second LTE cell 1230 then initiates an LTE handover operation of the UE 1210 to first LTE cell 1240 in step 1263.

In step 1264, the UE 1210 provides a B1 measurement report to the first LTE cell 1240, in which the first NR cell is identified. In step 1265, an NR leg setup operation is initiated to first NR cell 1250, with the first LTE cell 1240 acting as anchor cell.

Network scenario 1200 illustrates how examples of the methods disclosed herein may improve ToNR for a UE 1210. In conventional EN-DC processes, when a UE loses connection to an NR cell, it continues with the LTE anchor cell only, and the next opportunity for the UE to connect to an NR cell is following LTE handover. This can result in the relatively large NR outage area 470 illustrated in FIG. 4, which reduces ToNR for the UE. In addition, if the target cell of the LTE handover is unable to act as anchor, or if no supported combination NR cell is available, then a handover for EN-DC connectivity may be required to enable NR access again. This results in two handover operations before the UE has NR connectivity.

As illustrated in FIG. 12, examples of the present disclosure can greatly reduce the NR outage area. Example methods according to the present disclosure are able to initiate a process to identify an EN-DC capable combination of LTE and NR cells for a UE as soon as the UE loses connection to a NR cell, for example as indicted by the A2 measurement report. The UE does not therefore have to wait until it reaches the edge of its serving LTE cell before having an opportunity to connect to a new NR cell. In addition, examples of the present disclosure are also able identify a combination of LTE and NR cells that will reduce handover operations through the use of an operational criterion. This criterion may prioritize combination of acceptable LTE and NR signal strength, as opposed to focusing only on the LTE layer and failing to account for signal strength in the NR layer.

FIGS. 6 to 9 discussed above provide an overview of methods which may be performed according to different examples of the present disclosure. These methods may be performed by a management node and a radio access node, as illustrated in FIGS. 10 and 11, respectively, and may achieve improved ToNR when implemented in an EN-DC architecture, as illustrated in FIG. 12. There now follows a detailed discussion of how different process steps illustrated in FIGS. 6 to 9 and discussed above may be implemented in communication network, using the example of an EN-DC network architecture.

Figure 13:
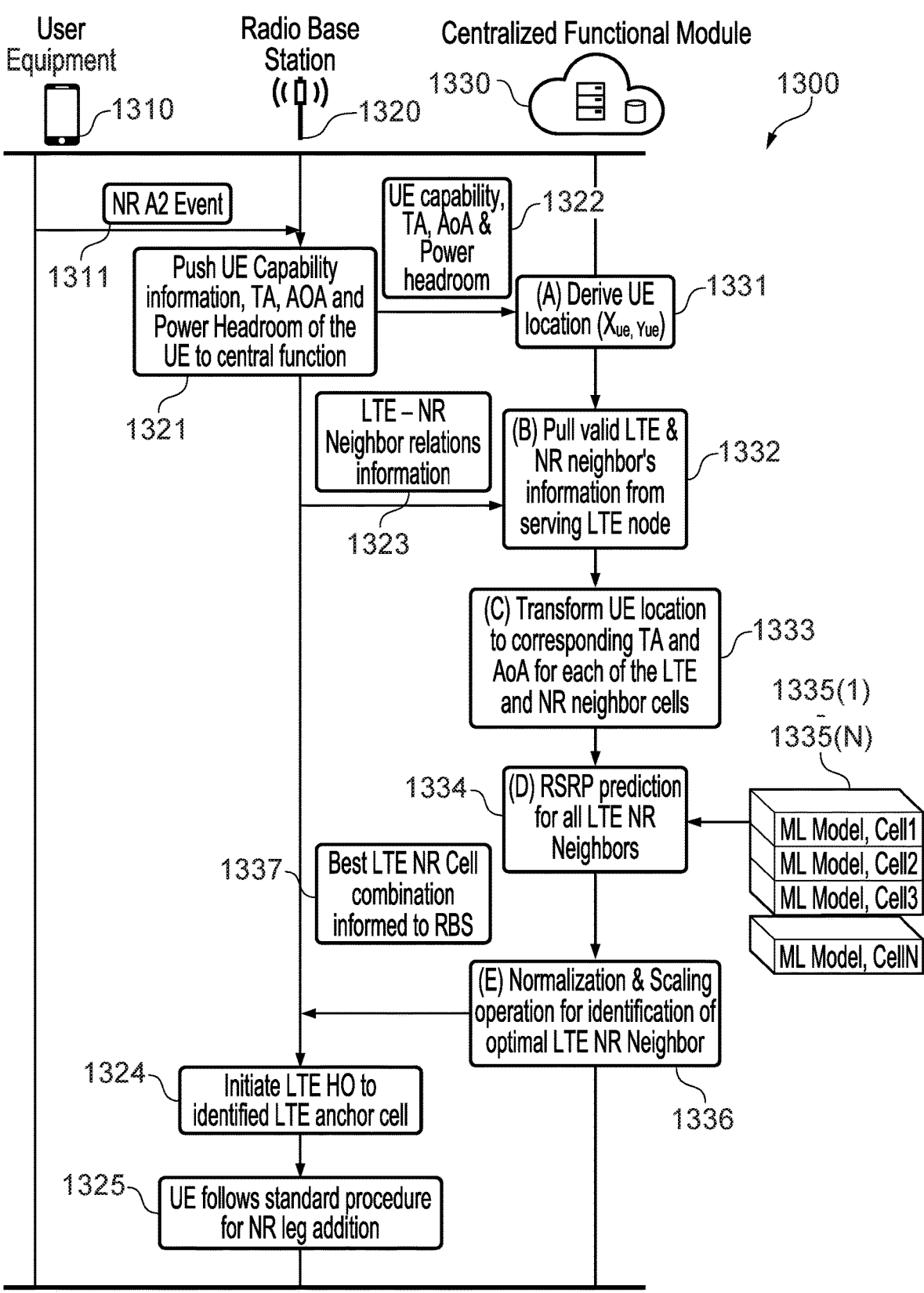
FIG. 13 is a functional flow diagram illustrating an example implementation of the methods of FIGS. 7 and 9.

FIG. 13 is a functional flow diagram 1300 illustrating message flow between a UE 1310, a serving radio access node 1320 providing an LTE cell to which the UE 1310 is connected, and a management node 1330. Management node 1330 may be deployed as a functional module in a cloud or a vRAN implementation centralized processing node. The management node 1330 is illustrated in FIG. 13 as 'centralized functional module'. FIG. 13 illustrates message frow that may take place between the UE 1310, radio access node 1320 and management node 1330 in an example implementation of the methods 700 and 900 discussed above.

Referring to FIG. 13, in step 1311, UE 1310 transmits an A2 measurement report to radio access node 1320, indicating that a signal strength of an NR cell to which the UE 1310 is connected has fallen below a signal strength threshold. As discussed above, an NR A2 measurement may be triggered in a scenario in which the UE 1310 approaches the edge of the NR cell coverage area. According to the event A2 settings (RSRP, RSRQ), when NR coverage becomes poorer than an NR A2 threshold, an event A2 will be triggered and UE 1310 will send an A2 measurement report to the radio access node 1320.

In step 1321, radio access node 1320 transmits UE capability information, UE power headroom information and UE location information 1322 to the management node 1330. The UE location information comprises UE Timing Advance (TA) and Angle of arrival (AoA) information relative to the radio access node 1320. In step 1331, the management node estimates the UE location in longitude and latitude based on the TA and AoA information transmitted by the radio access node 1320. In a parallel process, in step 1332, the management node 1330 obtains EN-DC frequency band combinations that are supported by the UE 1310, obtains the details of the neighbour LTE cells that are neighbour to the serving LTE cell provided by radio access node 1320, and obtains the details of the NR cells that are neighbours to the neighbour LTE cells. In some examples, in step 1323, LTE-NR neighbour information may be transmitted from the radio access node 1320 to the management node 1330. In other examples, the management node 1330 may determine this information based on the UE location information. Based on this information, the management node 1330 determines a candidate set of LTE and NR combinations, which are operable to provide EN-DC connectivity for the UE 1310.

In step 1333, the management node converts the estimated longitude and latitude of the UE into approximate TA and AoA of the UE relative to each cell of the candidate set of LTE and NR cell combinations. In step 1334, for each cell of the candidate set of LTE and NR combinations, the approximate TA and AoA of the UE relative to the cell is input to an appropriate trained ML model 1335(*n*). The model for the respective cell outputs predicted RSRP values for the cell based on the approximate TA and AoA information. Each ML model 1335(*n*) may be trained based on historic RSRP and UE location information for the relevant cell of the candidate set of LTE and NR cell combinations. In some examples, the predicted LTE RSRP values for the LTE neighbour cell may be modified by adding or subtracting the offset value as applicable for different neighbour frequencies or cells, from the LTE RSRP value predicted by the ML model 1335. For intra-frequency neighbours, cell individual offset (CIOffset) can be considered and for inter-frequency neighbours, carrier wise applicable frequency offset can be considered.

Referring still to FIG. 13, in step 1336, the predicted LTE and NR cell RSRP values are assessed against an operational criterion. As illustrated in FIG. 13, this process may comprise normalising and scaling the RSRP values in a 0 to 1 scale, which may decrease the processing load compared to processing the predicted RSRP values without normalising and scaling. In some examples, assessing the RSRP values against the operational criterion may further comprise creating a synthetic RSRP score value (a function of the predicted RSRP value) by combining the predicted RSRP values and the frequency priorities of the LTE and NR frequencies. The frequency priority for the LTE cells may be the endcHoFreqPriority, and the frequency priority for the NR cells may be endcB1MeasPriority. As discussed in greater detail below, the RSRP score values may be assessed against the operational criterion, and the LTE and NR cell combination which satisfies the operational criterion will be identified as an 'optimal combination' of cells for the UE 1310 to connect to for EN-DC.

In step 1337, the LTE cell of the optimal combination is reported to the radio access node 1320 and in step 1324, the radio access node 1320 initiates handover to the LTE cell of the optimal combination. The transfer of the UE 1310 to the LTE cell of the optimal combination begins upon reception of the handover request acknowledgement from the LTE cell of the optimal combination, followed by RRC connection reconfiguration. In step 1325, after handover of the UE to the new LTE cell, UE 1310 is configured for an NR B1 measurement and follows the standard procedure for a NR leg setup operation to connect to the NR cell of the optimal combination.

There now follows a more detailed discussion of how individual steps of the method 600, 700, 800, 900 may be implemented.

Deriving UE location in a global coordinate system (example implementation of steps 712, 1331)

Figure 14:
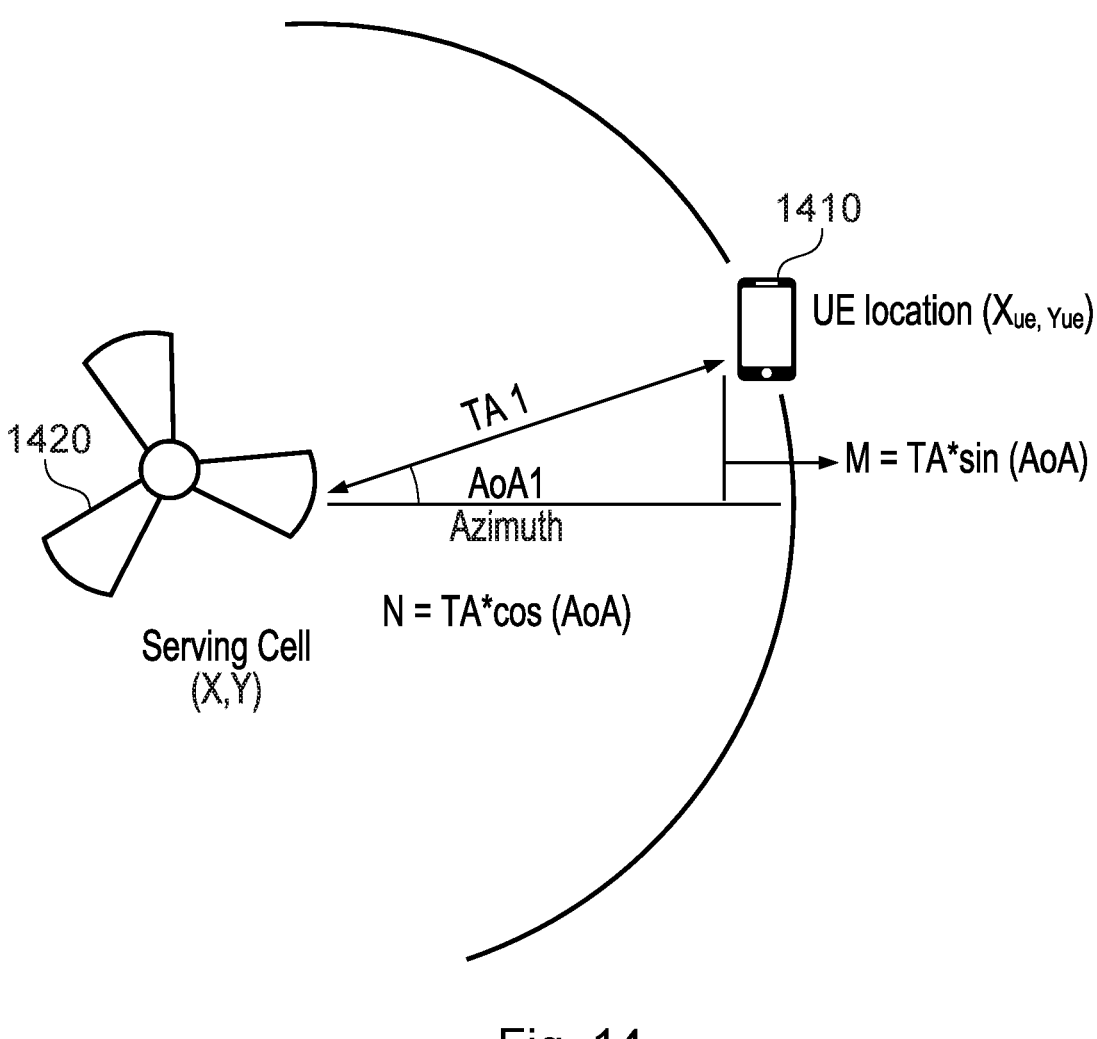
FIG. 14 illustrates UE timing advance (TA) and angle of arrival (AoA) relative to a base station.

FIG. 14 illustrates a UE 1410 positioned with respect to radio access node 1420 providing a serving cell for UE 1410. FIG. 14 illustrates how a management node may estimate the longitude and latitude of a UE based on TA and AoA information of the UE with respect to its serving radio access node.

Referring to FIG. 14, position (X,Y) is the latitude and longitude of the radio access node 1420, and ($X_{ue}$, $Y_{ue}$) is the latitude and longitude of the UE. The management node is able to access the position (X,Y) of the radio access node 1420, and the radio access node transmits the TA and AoA of the UE to the management node. The management node can consequently derive the position ($X_{ue}$, $Y_{ue}$) of the UE based on the TA and AoA of the UE with respect to radio access node 1420, and the position (X, Y) of the radio access node, using the trigonometric equations M=TA*cos(AoA) and N=TA*sin(AoA). The UE location in the global coordinate system of latitude and longitude is therefore a function of the radio access node position in that coordinate system: ($X_{ue}$, $Y_{ue}$)=f(X,Y).

Assembling candidate set of cell combinations (example implementation of steps 620, 630, 720, 730, 1332)

Figure 15:
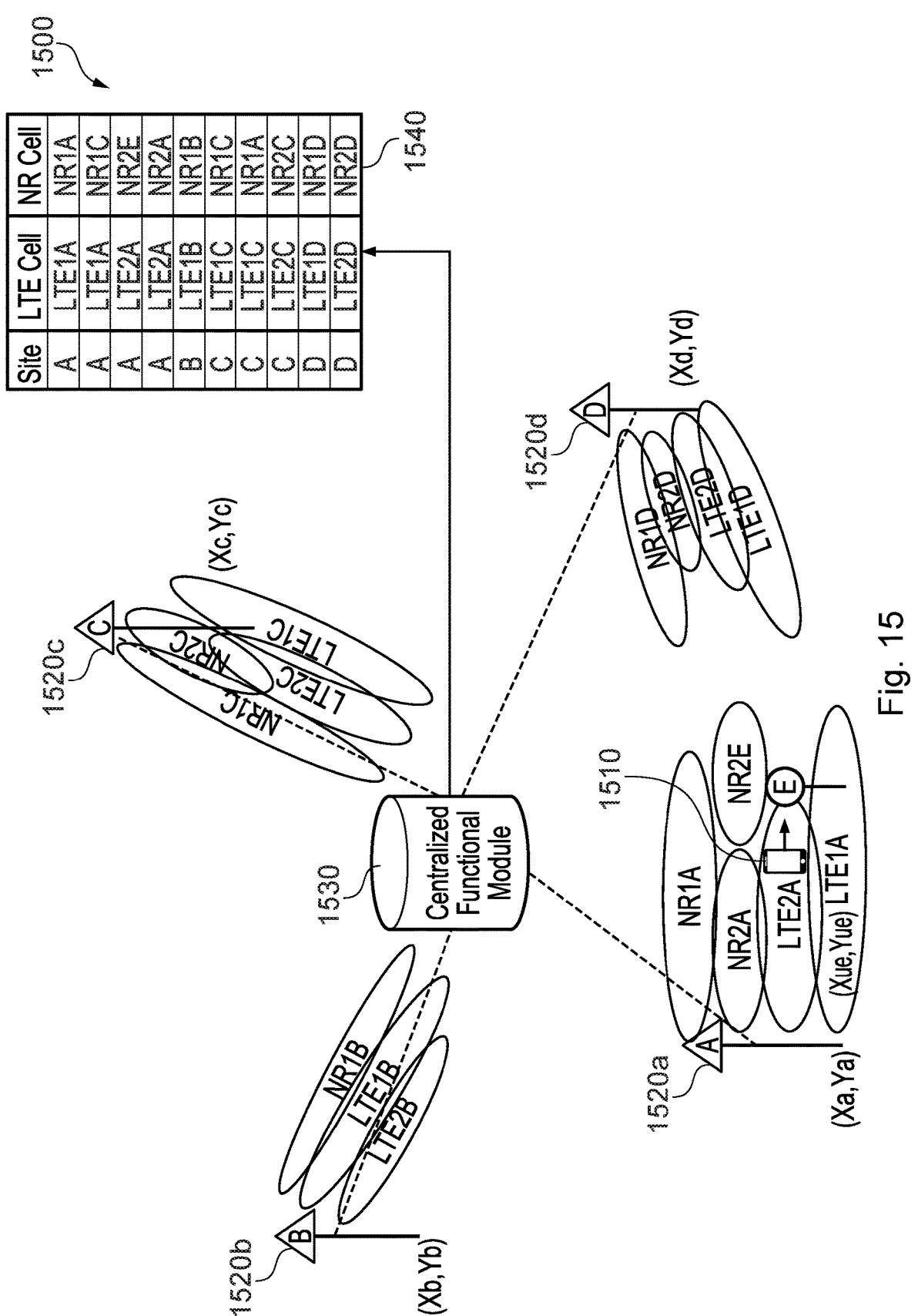
FIG. 15 illustrates a centralized functional module determining EN-DC cell combinations.

FIG. 15 illustrates an example 1500 of a management node 1530 assembling a candidate set of LTE and NR cell combinations 1540 to which a UE may connect for EN-DC.

As described above, once the latitude and longitude position of the UE has been estimated, the management node assembles a candidate set of LTE and NR cell combinations 1540 for EN-DC. Each combination of the candidate set comprises a pair of LTE and NR cells in which the LTE cell can be used as an anchor and the NR cell as a secondary cell for EN-DC. The combination of operating frequency bands of the cells in the pair should be supported by the UE in question.

FIG. 15 illustrates the process of management node 1530 assembling the candidate set of LTE and NR cell combinations 1540. In some examples, the management node 1530 may obtain information to identify cells for the candidate set of LTE and NR cell combinations 1540 from the serving LTE radio access node 1520a. In some examples, the management node 1530 may first obtain information identifying neighbour LTE cells of the serving LTE cell LTE2A, that is LTE1A, LTE1B, LTE2B etc. Based on the obtained neighbour LTE cells, the management node 1530 may then identify NR cells which are neighbours of the neighbour LTE cells e.g. NR2A, NR2E, NR1B, NR2C etc. Based on the identified cells and the requirement that frequency band combinations of the cell combinations in the candidate set be supported by the UE, the management node 1530 may assemble the candidate set of LTE and NR cell combinations 1540.

In some examples, the management node 1530 may extract the frequency band combinations which are supported by the UE 1510 from the UE capability information transmitted to the management node 1530 by the radio access node, for example as described at steps 710 and 1321 above. In some examples, the supported frequency band combinations may be extracted using the following information elements (IE):

> SupportedBandCombination—from rf-ParametersMRDC;
> SupportedBandEutra—from supportedBandListEUTRA; and
> SupportedBandNR—from irat-ParametersNR-15.

Figure 16:
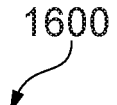
FIG. 16 is a table illustrating EN-DC cell combinations.

FIG. 16 is a table 1600 illustrating the candidate set of LTE and NR cell combinations with their associated frequency priority values. As described above, the frequency priority values may be considered in examples according to the present disclosure.

To assemble the table 1600, management node may first consider all the valid LTE neighbour cells of the serving LTE cell. As described above, to be a valid LTE neighbour, cells should allow LTE handover, be EN-DC capable and should be on-air. As further described above, once the valid LTE neighbour cells have been identified, the valid NR neighbour cells corresponding to the valid LTE neighbour cells will be added to the table 1600. Each valid NR neighbour cell should be paired with an LTE cell that is on air and whose frequency combination is supported by the UE.

Once the LTE and NR neighbour cells have been populated in table 1600, the corresponding endcHoFreqPriority value for the LTE cells can be populated in the table 1600. The endcHoFreqPriority is the LTE frequency priority value for EN-DC handover and may be considered in further processing by the management node to identify the optimal LTE and NR combination for the UE to connect to for EN-DC. In a similar manner, the endcB1MeasPriority value is populated in table 1600 for every NR cell. The endcB1MeasPriority is the NR frequency priority for EN-DC measurements and may also be used in further processing by the management node to identify the optimal LTE and NR combination for the UE for EN-DC.

Generate UE location with respect to each cell in the candidate set of combinations (example implementation of steps 740a, 1333)

Figure 17:
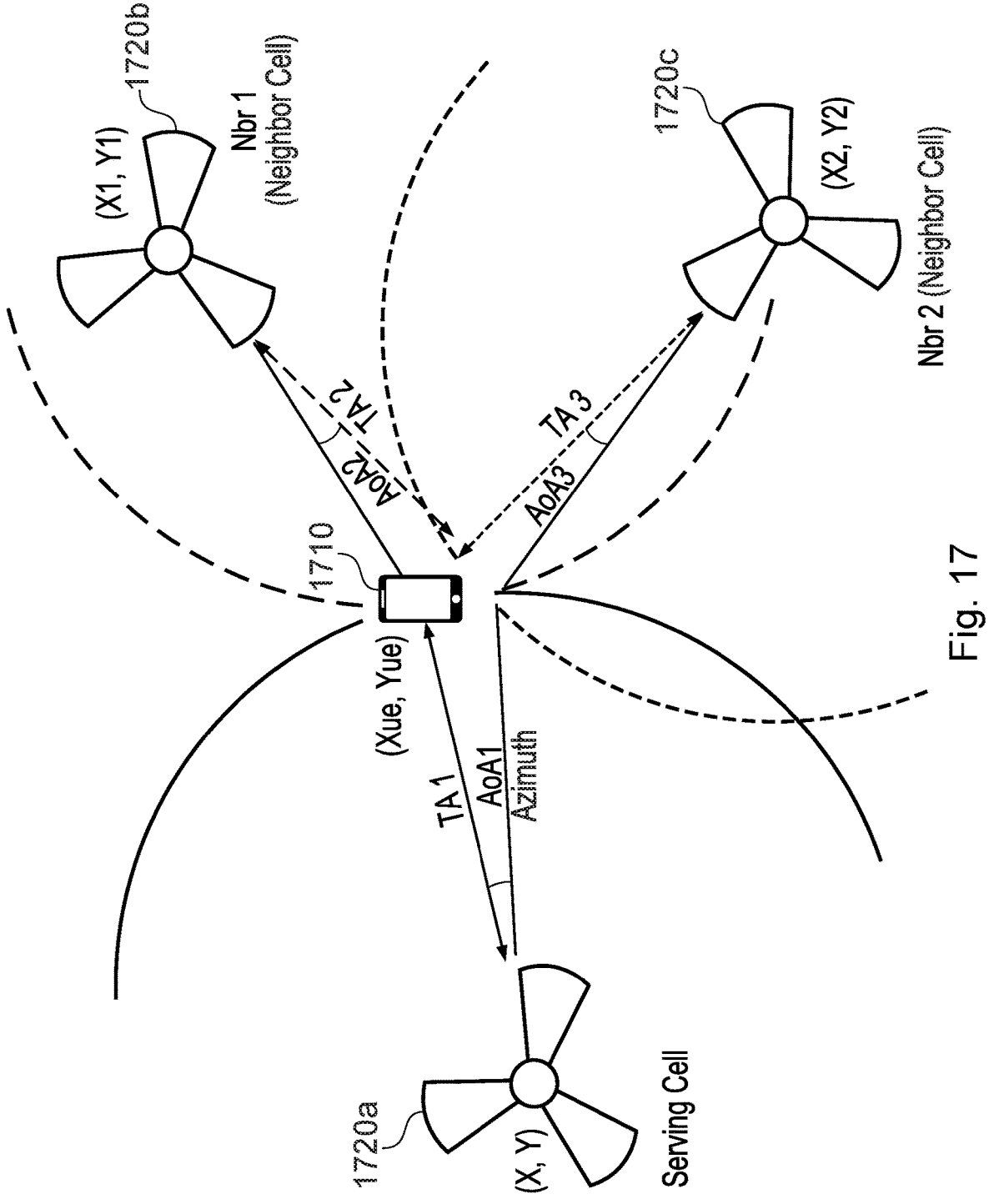
FIG. 17 illustrates UE TA and AoA relative to a plurality of base stations.

FIG. 17 illustrates a UE 1710 and radio access nodes 1720a-c. As described above, the management node may be configured to transform the latitude and longitude of the UE into TA and AoA information relative to each cell of the candidate set of combinations. The discussion provided below with regard to FIG. 17 presents one example of a suitable method to transform the UE latitude and longitude into TA and AoA information relative to each cell of the candidate set of combinations.

Referring to FIG. 17, the latitude and longitude of the UE is estimated by the management node as position ($X_{UE}$, $Y_{UE}$) based on the TA and AoA with respect to the serving cell 1720a, as described above. The management node has access to the latitude and longitude positions of each cell of the candidate set of combinations because these positions are known to the network. For example, first neighbor cell 1720b has a first latitude and longitude ($X_1$, $Y_1$) and the second neighbor cell 1720c has a second latitude and longitude ($X_2$, $Y_2$). Thus, from the estimated UE latitude and longitude ($X_{UE}$, $Y_{UE}$) and the latitude and longitude of the first and second neighbor cells 1720a, 1720c, the TA and AoA with respect to first neighbor cell 1720b and second neighbor cell 1720c may be determined using the equations M=TA*cos(AoA) and N=TA*sin(AoA).

The calculated values of TA and AoA for each cell of the candidate set of combinations are used as an input to the trained ML model for each respective cell, in order to predict the LTE and NR RSRP values at the current UE location.

Predicting received signal strength (example implementation of steps 640, 740, 740a-c, 1334)

Figure 18:
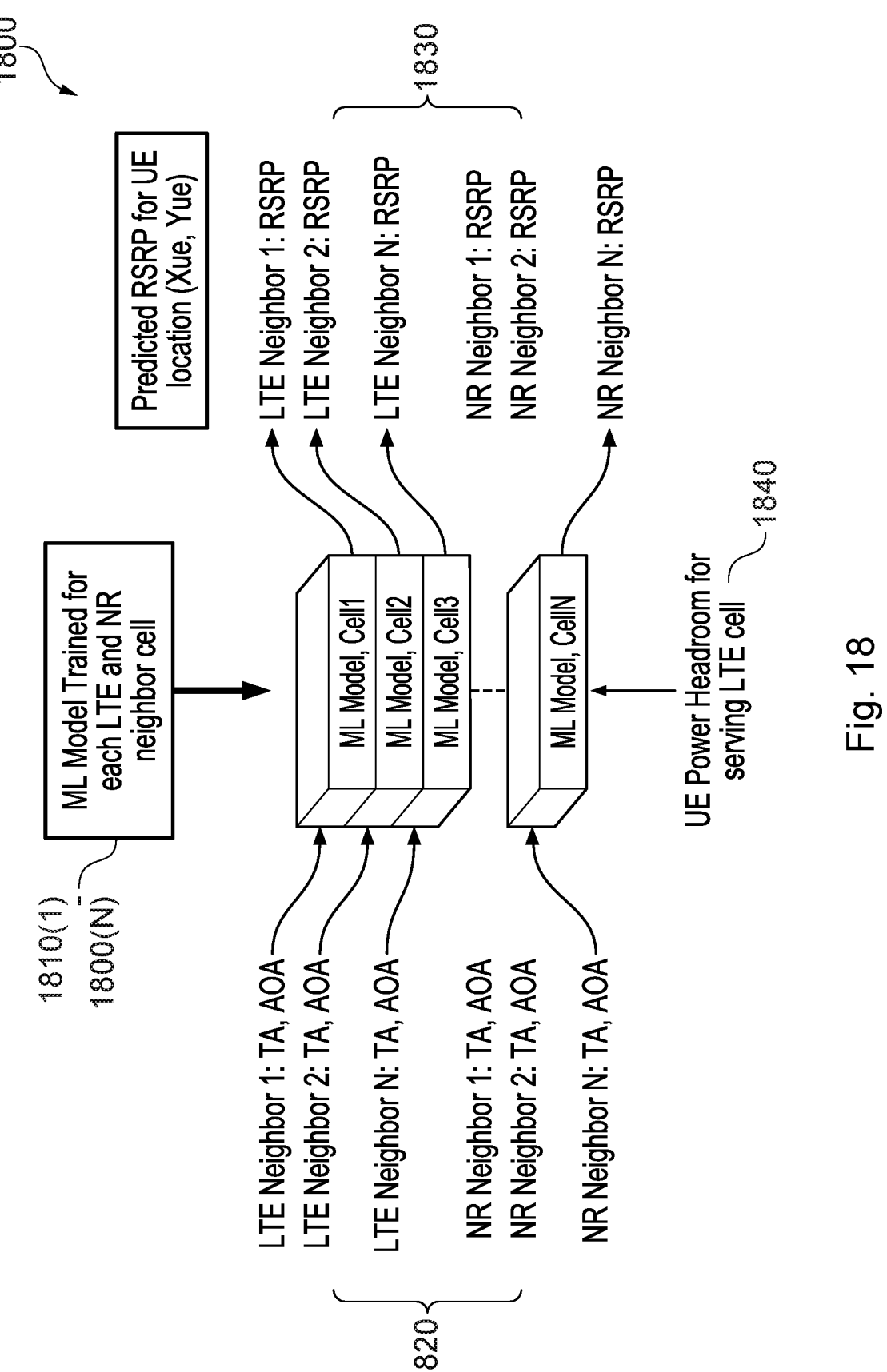
FIG. 18 illustrates a machine learning (ML) model trained to determine reference signal received power (RSRP) between a UE and a plurality of cells.

FIG. 18 illustrates an example ML architecture 1800 comprising a trained ML model 1810($n$) for each cell. Each ML model is trained to predict RSRP values based on TA and AoA information a respective cell. As described above, the management node may be configured to predict signal strength values for each cell of the candidate set of combinations based the TA and AoA information for each cell. The discussion provided below with regard to FIG. 18 presents one example of a suitable method to predict signal strength values for each cell of the candidate set of combinations based the TA and AoA information for each cell.

Referring to FIG. 18, for each cell in the candidate set of cell combinations, the calculated TA and AoA values 1820 for the cell are input to the appropriate trained ML model for the cell, together with the UE transmission power information (power headroom) received from the serving radio access node. The trained ML model outputs a predicted RSRP value 1830 for the relevant cell. The value is the RSRP that is predicted to be received from the cell by the UE at its current location. As discussed in greater detail below, the ML model may be trained on historic RSRP and UE location data.

Once the RSRP values have been predicted, the management node may subject the RSRP values to a normalising and scaling process, as described in step 1336 of FIG. 13. The normalising and scaling process is an example of the calculation, in step 740e, of the functions of the predicted received signal strengths.

FIG. 19 is a table 1900 illustrating the normalising and scaling process that may be performed by the management node.

In some examples, the predicted RSRP values may be modified by adding or subtracting offset values from the RSRP values, as described above. In other examples, the offset values may not be considered. A network operator may selectively disable or enable the consideration of offset in some examples. In examples in which the offset is considered, the modified offset values may be first be determined according to the relation: modified RSRP=predicted RSRP+offset, and subsequently used in the calculations described below.

Referring to FIG. 19, table 1900 includes normalised RSRP values for each of the cells of the candidate set of cell combinations. The normalised values may be determined for the LTE cells (x) and the NR cells (m) based on the respective maximum and minimum predicted RSRP values for the LTE cells and NR cells. For example, the normalised values for the LTE and NR cells may be determined according to: Normalised(z)={z−min(RSRP)}/{max(RSRP)−min(RSRP)}

Table 1900 also includes the LTE and NR frequency priority values, endcHoFreqPriority and endcB1MeasPriority, respectively. As described above in relation to FIG. 16, the management node may obtain these values, and may use them in weighting the normalised predicted RSRP values. As illustrated in table 1900, the frequency priority values are first multiplied by 0.1 to obtain modified LTE frequency Priority values (y) and modified NR frequency Priority values (n). LTE RSRP score values $Score_{LTE}$ are then obtained by multiplying the normalised LTE RSRP values (x) with the modified LTE frequency Priority values (y). NR RSRP score values $Score_{NR}$ are also obtained by multiplying the normalised NR RSRP values (m) with the modified NR frequency Priority values (n).

Identifying a cell combination that satisfies an operational criterion (example implementation of steps 650, 750, 750a-c, 1336)

As discussed above, the functions of the predicted RSRP values (the RSRP score values) may be assessed against the operational criterion in a two stage process. Initially, all cell combinations in which an LTE cell has an RSRP score above a threshold value are identified. Following this, from among the identified cell combinations, the cell combination having the highest NR RSRP score is identified as fulfilling the criterion. In one example, the threshold for the LTE RSRP score is set as the mean value of the LTE RSRP score values, and this mean value $Score_{LTE, mean}$ may be calculated by the management node. The $Score_{LTE, mean}$ is subtracted from all respective $Score_{LTE}$ values, and the LTE and NR cell combinations with a negative $Score_{LTE}$, following the subtraction of the $Score_{LTE, mean}$, will be excluded from further processing. This first stage of the assessment against the operational criterion helps to ensure that the management node will not identify as the 'optimal combination' an LTE and NR cell combination that has a high NR predicted RSRP but a poor LTE predicted RSRP. Such a cell combination would not be desirable for the UE because a stable LTE anchor cell connection is required for optimum EN-DC connectivity.

For example, referring to table 1900, the combination of LTE2C and NR2C has the highest NR RSRP score value $Score_{NR}$. However, this combination would not be desirable for the UE owing to the low LTE RSRP score value, $Score_{LTE}$, which is associated with this combination. Examples according to the present disclosure may thus filter the candidate set of combinations, such that only combinations with an acceptable predicted signal strength connection to the LTE anchor cell are considered by the management node in the second stage of assessment against the operational criterion.

Once the candidate set of combinations have been filtered based on the LTE RSRP score values $Score_{LTE}$ as described above, the NR RSRP score values $Score_{NR}$ of the remaining combinations are considered by the management node. The mean value of the NR RSRP score values $Score_{NR, mean}$ is calculated for the remaining combinations, and $Score_{NR, mean}$ is subtracted from each respective NR RSRP score value $Score_{NR}$ of the remaining combinations. The LTE and NR cell combination having the highest NR RSRP score value $Score_{NR}$ after the subtraction is identified as the combination satisfying the operational criterion.

Referring again to FIG. 19 and using table 1900 as an example, the mean $Score_{LTE}$ value as per calculation is $Score_{LTE,mean}$=Average(0.064, 0.327, 0.7, 0.159, 0.382, 0)=0.272. $Score_{LTE, mean}$ value is then subtracted from every LTE RSRP score value $Score_{LTE}$ and only the positive values are considered for further processing, thus filtering out combinations with an unacceptable signal strength to the LTE anchor cell. As per this calculation, only the combinations including LTE cells LTE1A, LTE1B and LTE1C are maintained for further processing.

The remaining combinations following the filtering procedure are thus LTE1A-NR1A, LTE1B-NR1B and LTE1C-NR1C. An NR RSRP score mean value $Score_{NR, mean}$ is calculated for the NR cells of these remaining combinations. $Score_{NR, mean}$=Average(0.408, 0.333, 0.3)=0.347. The $Score_{NR, mean}$ is subtracted from each of the $Score_{NR}$ values for the remaining combinations. The combination with the highest value after the subtraction will be selected as the combination which satisfies the operational criterion.

From the example of Table 1900, the combination with the highest NR RSRP score value $Score_{NR}$, after the subtraction is the combination of LTE1A and NR1A. This combination is thus selected as the combination that satisfies the operational criterion and may thus be considered the 'optimal combination'.

Once the combination that satisfies the operational criterion has been identified, the management node transmits to the radio access node serving the UE information identifying the LTE anchor cell of the combination that satisfies the operational criterion. The radio access node then transmits a handover command to the UE initiating an LTE handover operation for the UE to connect to the LTE anchor cell of the combination that satisfies the operational criterion. After the UE successfully hands over to the identified LTE anchor cell of the combination that satisfies the operational criterion, the UE will perform a secondary node (SN) addition operation to connect to the NR cell of the combination that satisfies the operational criterion. The UE may perform this operation as per conventional EN-DC procedures, for example based on B1 NR measurement configuration and reporting.

Figure 20A:
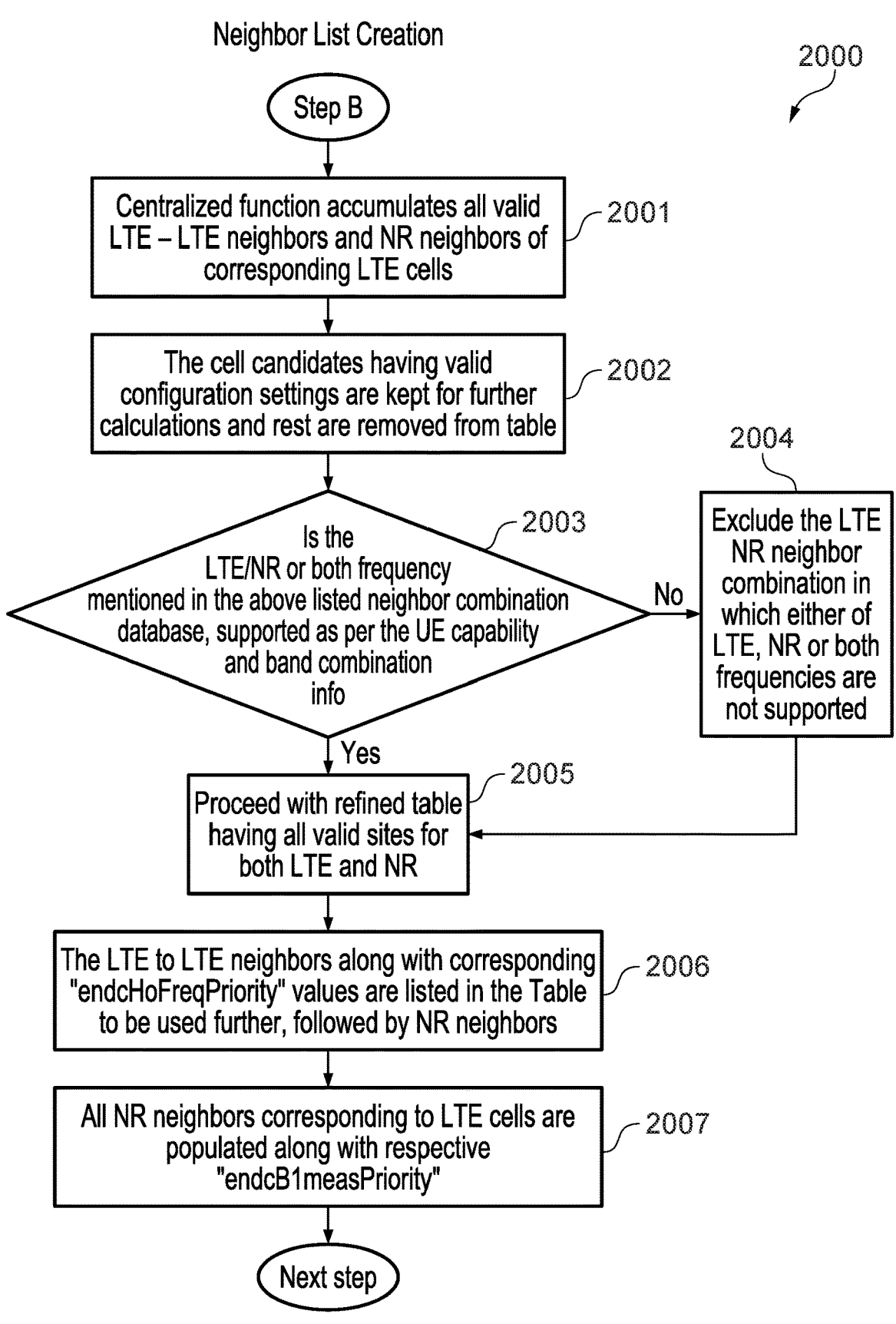
FIGS. 20a and 20b are a flow charts illustrating implementation of different method steps from the methods of FIGS. 6, 7 and 13.
Figure 20B:
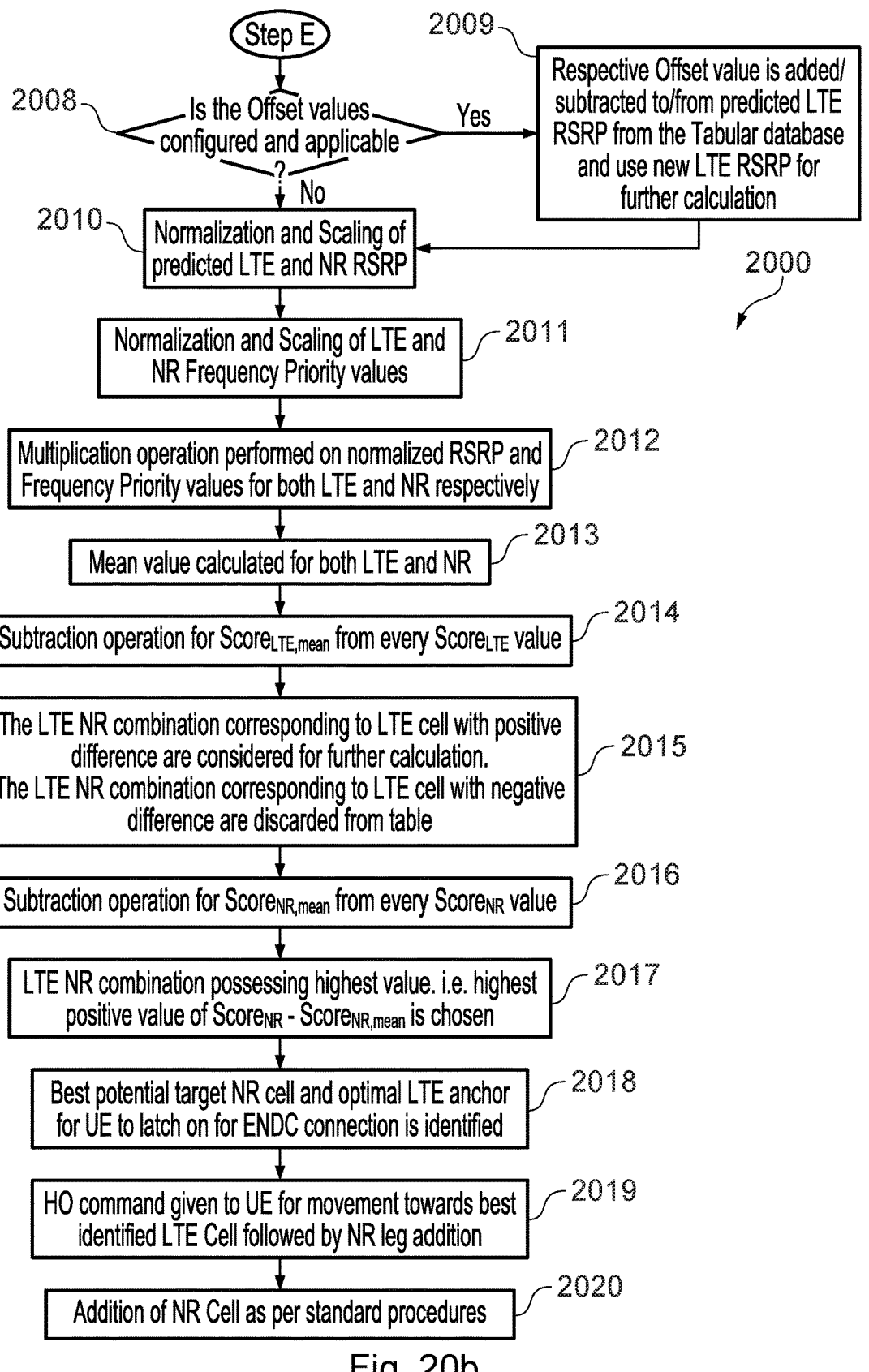

FIGS. 20a & 20b show a flowchart illustrating an example implementation 2000 of particular steps in the methods 600, 700, performed by a management node. Specifically, FIG. 20a illustrates an implementation of the neighbor list creation and candidate set assembly steps 620, 630, 720, 730 of the methods 600, 700, and FIG. 20b illustrates an implementation of the identification of a cell combination, including normalization and scaling, and triggering suitable handover of steps 650, 660, 750, 760.

The steps of FIG. 20a take place after obtaining neighbor relation information for the serving radio cell, for example from the serving radio cell (as illustrated in step 1323 of FIG. 13), or from any other source, including for example a local memory, central repository, or other management node. FIG. 20a refers to an implementation of the management node that comprises a centralized function. Referring to FIG. 20a, in step 2001, the management node identifies in a list all LTE neighbors of the serving LTE cell, and all NR neighbors of the identified LTE neighbor cells. The list may comprise the beginning of a table for identification of a suitable cell combination, such as the table 1900 of FIG. 19.

In step 2002, cell candidates having "valid" configuration settings are maintained in the list, with others being removed. "Valid" configuration settings may refer to cells that are EN-DC capable and are available for handover.

In step 2003, the management node checks possible combinations of LTE and NR cells against UE capabilities. As illustrated, this may comprise checking that the frequency band combination of a potential cell combination is supported by the UE as indicated in UE capability information. Combinations in which either the LTE operating frequency, NR operating frequency, or the frequency band combination is not supported by the UE are removed from the list in step 2004. In step 2005, a refined list comprising only those combinations that are supported by the UE is ready for further consideration. This list comprises the candidate set of neighbor cell combinations to which the UE is operable to connect.

In steps 2006 and 2007, the table discussed above starts to be formed, with the priority values endcHoFreqPriority, for the LTE neighbor cells, and endcB1MeasPriority of the NR neighbor cells being populated. These priority values will be used to weight the normalized predicted RSRP values as discussed above.

Following the identification of neighbors and assembly of the candidate set as illustrated in FIG. 20*a*, the management node proceeds to predict RSRP values from the cells in the candidate set that would be experienced by the UE in its current location, using trained ML models for each cell under consideration. A more detailed discussion of this ML step is provided below, with reference to FIGS. 21 to 23.

FIG. 20*b* illustrates an implementation of the identification of a cell combination, including normalization and scaling, and triggering suitable handover, that takes place following prediction of RSRP values for cells in the candidate set. Referring to FIG. 20*b*, the management node checks in step 2008 whether offset values are configured and applicable to the predicted RSRP values for each LTE cell of the candidate set of combinations. If the offset values are configured and applicable, in step 2009 the management node adds/subtracts the relevant offset value to/from the predicted RSRP value that has been populated into the table, and proceeds to subsequent steps using the modified predicted RSRP value including the offset.

In step 2010, the management node performs normalizing and scaling of the predicted RSRP values for the LTE and NR cells of the candidate set of combinations. In step 2011, the management node performs normalizing and scaling of the frequency priority values for the LTE and NR cells of the candidate set of combinations. In step 2012, the management node then multiplies the normalized predicted RSRP values by the relevant normalized frequency priority values for each of the LTE and NR cells to obtain the RSRP score values $\text{Score}_{LTE}$ and $\text{Score}_{NR}$. These score values comprise the values of the functions of the predicted signal strengths discussed in the methods 600 and 700.

In step 2013, the management node calculates the mean score values $\text{Score}_{LTE, mean}$, $\text{Score}_{NR, mean}$ of the RSRP score values $\text{Score}_{LTE}$ and $\text{Score}_{NR}$. These mean values are used for the assessment of the scores against the operating criterion. As discussed above, the operating criterion imposes a minimum threshold for LTE signal strength (as scaled, normalized and weighted with priority), and then requires selection of the combination comprising the NR cell with the highest NR RSRP signal strength, from all combinations satisfying the minimum LTE strength threshold. The minimum LTE strength threshold is set as the mean value of all predicted LTE RSRP scores.

In step, 2014, the management node subtracts the mean value $\text{Score}_{LTE, mean}$ from each of the LTE RSRP score values $\text{Score}_{LTE}$ to calculate an LTE difference. Following this subtraction, in step 2015, the combinations with a positive LTE difference are considered for further calculations, with combinations with a negative LTE difference being discarded. This step ensures a minimum signal strength on the LTE cell of the combination, as a stable connection is required for an LTE cell to act as anchor.

In step 2016, the management node subtracts the mean NR RSRP score value $\text{Score}_{NR, mean}$ from the NR RSRP score values of the remaining combinations to calculate NR differences. In step 2017, the management node selects the remaining combination having the highest NR difference as being the combination that satisfies the operational criterion, balancing stability of connection on both the LTE and NR levels. Having identified the cell combination that satisfies the operational criterion, the management node causes the serving cell to send a handover command to the UE in step 2019, triggering the UE to handover to the LTE cell of the identified combination. Following handover, the UE can then perform NR leg setup using standard procedures in step 2020. As discussed above, in the vast majority of situations, the UE will independently identify the NR cell of the identified combination for setup of the NR leg through the B1 measurement configuration and reporting, assuming the ML model has made a reasonably accurate prediction of signal strength values. However, in some rare circumstances, unforeseen events may lead to the NR cell of the identified combination being temporarily unavailable. In such circumstances, using the B1 measurement enables the UE to identify any other NR cell that may be available and operable to support ENDC using the new serving LTE cell as anchor.

Prediction of signal strength values using an ML model (example implementation of steps 640, 7401, 740*b*, 740*c*, 740*d*, 1334)

ML models are used by the management node to predict signal strength values, for example RSRP, of LTE and NR cells in the assembled candidate set. The prediction is based on the current UE location with respect to each cell under consideration, which may be represented as the calculated TA and AoA with respect to the cells, as translated from a global coordinate system such as latitude and longitude. The UE power headroom, or another measure of UE transmission power information, may also be used for the prediction. Each ML model may consequently accept as input three features:

| Feature Name | Description |
| --- | --- |
| Timing Advance (TA) | Represents distance of the UE from a given cell location. |
| Angle of Arrival (AOA) | Represents bearing of the UE location with respect to cell location |
| Power Headroom | Indicates how much transmission power left for a UE to use in addition to the power being used by current transmission. |

For each cell for which RSRP values are to be predicted, the above described features may be collected from historical periods of operation of the cells, and stored for the purpose of training or updating the prediction model. FIG. 21 illustrates an example of historic RSRP data 2100 with respect to UE location relative to a radio access node. Data such as that represented in FIG. 21 can be used to train an ML model specific to each cell. In some examples, the data may be gathered over a minimum time period, for example to ensure the data represents period changes in network operational conditions, UE movement patterns etc. In other examples, a particular size of data set may be required, or other conditions may be imposed on the data set before training of the ML model is conducted, so as to ensure that the trained model is able to predict RSRP values with an acceptable accuracy.

Figure 23:
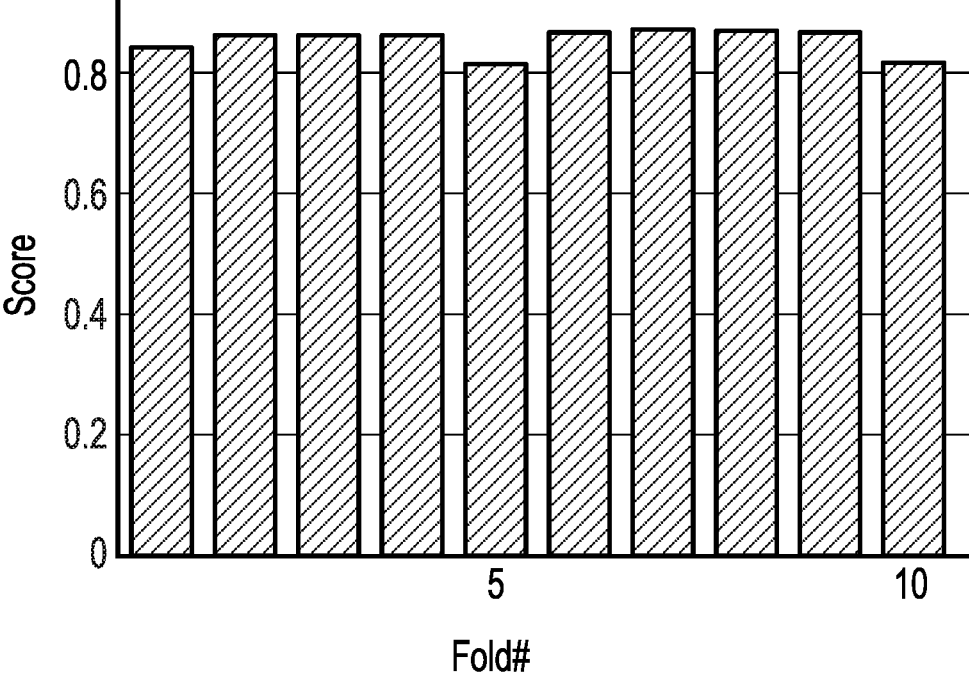
FIG. 23 is a graph illustrating cross-validation scores for an ML model.

In one example, the ML model may comprise a random forest model, which is trained separately for each cell site. FIG. 22 illustrates a graph 2200 showing the predicted RSRP values for a particular cell site, predicted using the trained random forest model, against the actual RSRP values for differing UE locations. As illustrated, a Mean Average Error (MAE) of 2.64 was obtained using the trained random forest model. FIG. 23 also illustrates a graph 2300 showing the results of a ten-fold cross validation to ensure that the random forest model was not overfitting. The model obtained an accuracy score of 0.86±0.04 with cross validation scores of 0.84495391, 0.86722095, 0.86703267, 0.86506735, 0.81894825, 0.87161421, 0.87679781, 0.87733897, 0.87004521 and 0.82252099.

Other examples of ML model that could be contemplated for the signal strength prediction model include Decision Trees and, k-Nearest Neighbours (KNN) regression. Neural Networks can also be used as the ML models for the various neighbour cells.

Implementation Architecture

Figure 24:
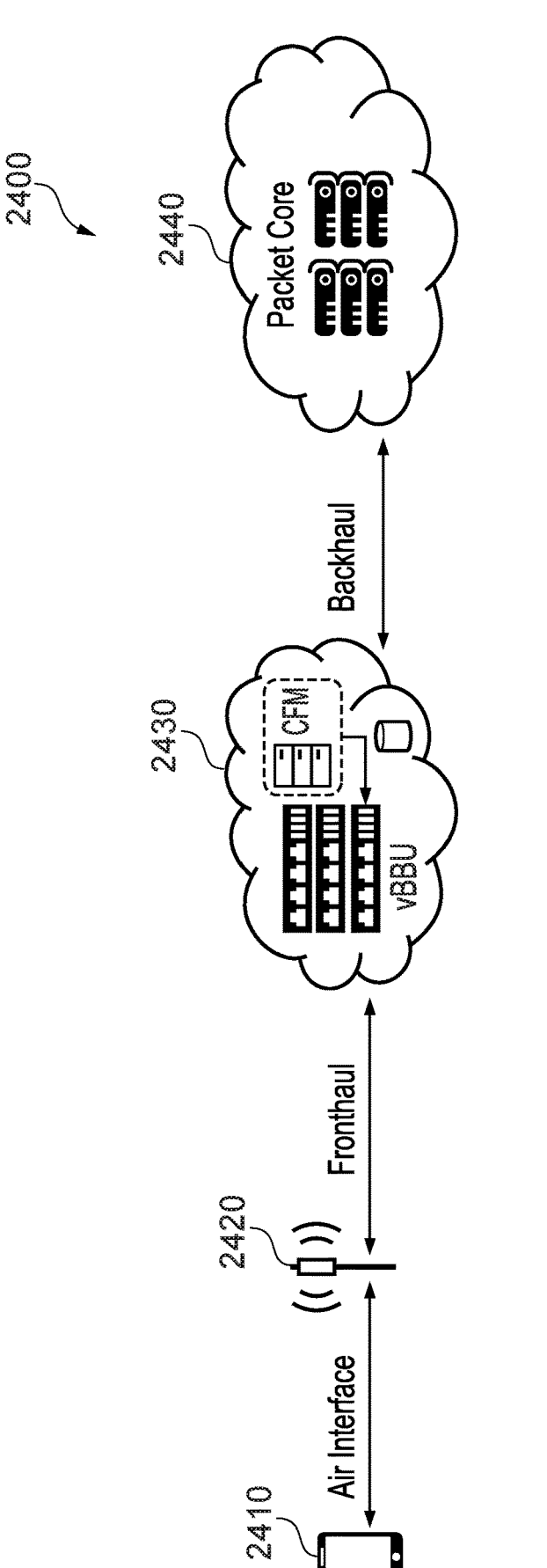
FIG. 24 illustrates an example implementation architecture.

As discussed above, the management node performing example methods according to the present disclosure may be implemented as a physical or virtual node, and FIG. 24 illustrates an example implementation architecture 2400 in which the management node is implemented as a functional unit within a virtualized Baseband Unit (vBBU) 2430. The vBBU 2430 is connected over a Fronthaul connection to a radio access node 2420, and the radio access node 2420 is connected over the air interface to the UE 2410. The vBBU is connected over a Backhaul connection to the packet core 2440.

The architecture illustrated in FIG. 24 is merely one example, as the management node may be implemented as a virtualized control unit within, for example, a C-RAN (BBU office), or a disaggregated vRAN (vCU), in addition to the vBBU of a vRAN as illustrated. As illustrated in FIG. 24, all LTE and NR nodes are connected to the centralized processing unit, which simplifies deployment and operation, as well as incorporating lower latency in calculating the best neighbor pair to latch on to, without the need of any measurement configuration and measurement reports.

Example methods and nodes presented herein thus provide a mechanism by which NR outage in areas where NR coverage is available may be reduced for UEs. NR outage might be experienced for example if a UE is not able to access an NR cell owing to the unavailability of functionality to trigger the NR leg addition as per current LTE anchor layer strategies and various supported band combinations. NR outage may also be experienced when a UE is connected to an LTE anchor cell that does not have suitable candidate coverage from an NR cell, when such coverage might be available if the UE was connected to a different LTE anchor cell.

Examples of the present disclosure reduce NR outage by finding a suitable LTE and NR cell combination for a UE and triggering an LTE to LTE handover. This combination is not identified on the basis of measurement reports sent by UE but rather using an ML algorithm which predicts the probable LTE and NR RSRP in the specific UE position from possible LTE and NR neighbor combinations of the serving LTE sector.

Example methods according to the present disclosure initiate a process to identify a suitable combination of an LTE anchor cell and an NR secondary cell as soon as a UE loses connection to an NR cell. Under conventional EN-DC procedures, the UE has to wait for an LTE layer handover before reestablishing NR connection, and may require an additional handover operation for EN-DC connectivity in order to move to a suitable LTE anchor cell. Example methods according to the present disclosure can reduce the delay between losing and reestablishing NR connectivity, resulting in higher ToNR for the UE.

As noted above, the combination of LTE anchor cell and NR secondary cell that is identified offers a stable connection to both the LTE anchor cell and the NR secondary cell, further improving ToNR. This connection is identified using predicted RSRP values, so reducing the dependency of EN-DC procedures on radio resource measurements for mobility procedures. The identified combination is also supported by the UE, being EN-DC capable and having a frequency band combination that is compatible with the UE capabilities. In this manner, it is possible to avoid additional handover operations, in which the UE initially hands over to an LTE cell that cannot operate as an anchor, or can only anchor for an NR cell on a frequency band that the UE does not support, before the UE is handed over again to a suitable LTE anchor cell.

Example methods and nodes according to the present disclosure are fully compliant with cloud-based solutions, ensuring versatility, low latency and simplified deployment and operation.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A computer implemented method for managing connectivity of a wireless device in a cellular communication network, wherein the wireless device is operable to connect to a cell of a first radio-access technology, RAT, and to a cell of a second RAT, the method, performed by a management node, comprising:

receiving, from a radio access node serving the wireless device, location information for the wireless device, wherein the wireless device is connected to a first RAT cell hosted by the serving radio access node, and is also connected to a second RAT cell, and wherein a signal strength of the second RAT cell, received at the wireless device, has fallen below a trigger threshold;

identifying first RAT cells in the communication network that are neighbours of the first RAT cell to which the wireless device is connected, and identifying second RAT cells in the communication network that are neighbours of the identified first RAT cells;

assembling, from the identified first RAT cells and second RAT cells, a candidate set of cell combinations, wherein each cell combination in the candidate set comprises a pair of a first RAT cell and a second RAT cell to which the wireless device is operable to connect;

for cell combinations in the candidate set, using a Machine Learning, ML, model to predict a received signal strength at the wireless device of the first RAT cells and the second RAT cells of the cell combinations, based on the received location information for the wireless device;

identifying, from the candidate set of cell combinations, a cell combination for which the predicted received signal strengths of the first RAT cell and the second RAT cell of the combination satisfy an operational criterion, wherein a cell combination that satisfies the operational criterion comprises the cell combination for which a function of the predicted received signal strength of the second RAT cell of the combination has the highest value of all cell combinations in the candidate set for which a function of the predicted received signal strength of the first RAT cell of the combination is above a minimum threshold value; and causing the radio access node serving the wireless device to initiate handover of the wireless device to the first RAT cell of the identified cell combination.

2. A computer-implemented method according to claim 1 wherein identifying, from the candidate set of cell combinations, a cell combination for which the predicted received signal strengths of the first RAT cell and the second RAT cell of the combination satisfy the operational criterion comprises:

selecting cell combinations in the candidate set for which a function of the predicted received signal strength of the first RAT cell of the combination is above a minimum threshold value; and identifying, from the selected cell combinations, the cell combination for which a function of the predicted received signal strength of the second RAT cell of the combination has the highest value.

3. A computer implemented method according to claim 1, wherein the function of the predicted received signal strength of the first RAT cell comprises:

a normalised value of the predicted received signal strength of the first RAT cell.

4. A computer implemented method according to claim 3, wherein the function of the predicted received signal strength of the first RAT cell comprises:

a normalized and weighted value of the predicted received signal strength of the first RAT cell, wherein the weighting factor comprises a function of the frequency priority of the first RAT cell.

5. A computer implemented method according to claim 1, wherein the function of the predicted received signal strength of the second RAT cell comprises:

a normalized value of the predicted received signal strength of the second RAT cell.

6. A computer implemented method according to claim 5, wherein the function of the predicted received signal strength of the second RAT cell comprises:

a normalized and weighted value of the predicted received signal strength of the second RAT cell, wherein the weighting factor comprises a function of the frequency priority of the second RAT cell.

7. A computer implemented method according to claim 1, wherein using an ML model to predict a received signal strength at the wireless device of the first RAT cells and the second RAT cells of the cell combinations, based on the received location information for the wireless device, further comprises calculating the functions of the predicted received signal strengths.

8. A computer implemented method according claim 1, wherein a pair of a first RAT cell and a second RAT cell to which the wireless device is operable to connect comprises a pair in which:

the first RAT cell is operating on a first frequency band;

the second RAT cell is operating on a second frequency band; and the combination of the first frequency band and the second frequency band is a combination that is supported by the wireless device.

9. A computer implemented method according to claim 1, further comprising:

receiving, from the radio access node serving the wireless device, capability information for the wireless device, wherein the capability information comprises frequency band combinations supported by the wireless device; and wherein assembling, from the identified first RAT cells and second RAT cells, a candidate set of cell combinations, wherein each cell combination in the candidate set comprises a pair of a first RAT cell and a second RAT cell to which the wireless device is operable to connect comprises:

populating the candidate set with only those combinations of first RAT cells and second RAT cells whose frequency band combinations are supported by the wireless device.

10. A computer implemented method according to claim 1 wherein using an ML model to predict a received signal strength at the wireless device of the first RAT cells and the second RAT cells of the cell combinations, based on the received location information for the wireless device, comprises, for each of the first RAT cells and second RAT cells of the cell combinations:

generating from the location information a location of the wireless device with respect to the radio access node hosting the cell;

inputting, to a trained ML model for the cell, the generated location of the wireless device with respect to the radio access node hosting the cell, wherein the trained ML model for the cell is operable to process the input location in accordance with its trained parameters; and obtaining from the trained ML model for the cell an output comprising the predicted signal strength of the cell that would be received by the wireless device in the represented location.

11. A computer implemented method according to claim 10, wherein, for each cell, the trained ML model for the cell is trained using historic received signal strength measurements and wireless device locations with respect to the radio access node hosting the cell.

12. A computer implemented method according to claim 10 wherein the location of the wireless device with respect to the radio access node hosting the cell comprises a Timing Advance and Angle of Arrival of the wireless device with respect to the radio access node.

13. A computer-implemented method according to claim 1, further comprising:

receiving, from the radio access node serving the wireless device, transmission power information for the wireless device; and wherein using an ML model to predict a received signal strength at the wireless device of the first RAT cells and the second RAT cells of the cell combinations, based on the received location information for the wireless device, further comprises using the ML model to predict a received signal strength at the wireless device based on the received transmission power information for the wireless device.

14. A computer-implemented method according to claim 1 wherein the received location information for the wireless device provides a location of the wireless device with respect to the serving radio access node, the method further comprising:

Converting the received location information to a location of the wireless device in a global coordinate system using a location of the serving radio access node in the global coordinate system.

15. A computer implemented method according to claim 14, wherein generating from the location information a representation of the wireless device location with respect to the radio access node hosting the cell comprises:

converting the location of the wireless device in the global coordinate system to a location of the wireless device with respect to the radio access node hosting the cell, using a location of the radio access node hosting the cell in the global coordinate system.

16. A computer-implemented method according to claim 1, wherein the received location information for the wireless device comprises a Timing Advance and Angle of Arrival of the wireless device with respect to the radio access node serving the wireless device.

17. A computer implemented method according to claim 1, wherein causing the radio access node serving the wireless device to initiate handover of the wireless device to the first RAT cell of the identified cell combination comprises: sending to the radio access node serving the wireless device an identifier of the first RAT cell of the identified cell combination.

18. A management node for managing connectivity of a wireless device in a cellular communication network, wherein the wireless device is operable to connect to a cell of a first radio-access technology, RAT, and to a cell of a second RAT, the management node comprising processing circuitry configured to cause the management node to:

receive, from a radio access node serving the wireless device, location information for the wireless device, wherein the wireless device is connected to a first RAT cell hosted by the serving radio access node, and is also connected to a second RAT cell, and wherein a signal strength of the second RAT cell, received at the wireless device, has fallen below a trigger threshold;

identify first RAT cells in the communication network that are neighbours of the first RAT cell to which the wireless device is connected, and identify second RAT cells in the communication network that are neighbours of the identified first RAT cells;

assemble, from the identified first RAT cells and second RAT cells, a candidate set of cell combinations, wherein each cell combination in the candidate set comprises a pair of a first RAT cell and a second RAT cell to which the wireless device is operable to connect;

for cell combinations in the candidate set, use a Machine Learning, ML, model to predict a received signal strength at the wireless device of the first RAT cells and the second RAT cells of the cell combinations, based on the received location information for the wireless device;

identify, from the candidate set of cell combinations, a cell combination for which the predicted received signal strengths of the first RAT cell and the second RAT cell of the combination satisfy an operational criterion, wherein a cell combination that satisfies the operational criterion comprises the cell combination for which a function of the predicted received signal strength of the second RAT cell of the combination has the highest value of all cell combinations in the candidate set for which a function of the predicted received signal strength of the first RAT cell of the combination is above a minimum threshold value; and cause the radio access node serving the wireless device to initiate handover of the wireless device to the first RAT cell of the identified cell combination.

19. A radio access node for managing connectivity of a wireless device in a cellular communication network, wherein the wireless device is operable to connect to a cell of a first radio-access technology, RAT, and to a cell of a second RAT, the radio access node comprising processing circuitry configured to cause the radio access node to:

receive, from the wireless device, an indication that the received signal strength of a second RAT cell, to which the wireless device is also connected, has fallen below a trigger threshold;

transmit, to a management node, location information for the wireless device, wherein the management node is configured to identify a cell combination comprising a pair of a first RAT cell and a second RAT cell to which the wireless device is operable to connect and which combination satisfies an operational criterion, wherein the operational criterion comprises: for all cell combinations in which a function of the predicted received signal strength of the first RAT cell of the combination is above a minimum threshold value, the cell combination for which a function of the predicted received signal strength of the second RAT cell of the combination has the highest value; and responsive to a prompt from the management node, initiate handover of the wireless device to the first RAT cell of the identified cell combination.

\* \* \* \* \*